(12) United States Patent
Lin et al.

(10) Patent No.: US 12,165,293 B2
(45) Date of Patent: Dec. 10, 2024

(54) METHOD AND APPARATUS FOR ENHANCING TEXTURE DETAILS OF IMAGES

(71) Applicant: SAMSUNG ELECTRONICS CO., LTD., Suwon-si (KR)

(72) Inventors: Kaimo Lin, Allen, TX (US); Hamid Sheikh, Allen, TX (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 487 days.

(21) Appl. No.: 17/487,538

(22) Filed: Sep. 28, 2021

(65) Prior Publication Data

US 2023/0097869 A1  Mar. 30, 2023

(51) Int. Cl.
*G06T 5/77* (2024.01)
*G06T 3/4053* (2024.01)
(Continued)

(52) U.S. Cl.
CPC ............... *G06T 5/77* (2024.01); *G06T 5/50* (2013.01); *G06T 7/337* (2017.01); *G06V 10/54* (2022.01);
(Continued)

(58) Field of Classification Search
CPC . G06T 5/77; G06T 5/00; G06T 11/001; G06T 7/337; G06T 7/74; G06T 5/50; G06T 2207/20221; G06T 3/14; G06T 2207/20081; G06T 2207/20084; G06T 7/60; G06T 7/62; G06T 7/64; G06T 3/4053; G06T 3/4076; G06V 10/54; G06V 10/74; G06V 10/26; G06V 10/24; G06V 10/242;
(Continued)

(56) References Cited

U.S. PATENT DOCUMENTS 10,909,357 B1  2/2021  Tulyakov et al.
10,984,532 B2  4/2021  Sargent et al.
(Continued)

FOREIGN PATENT DOCUMENTS

CN  112712470 A  *  4/2021

OTHER PUBLICATIONS

Yue et al., "Landmark Image Super-Resolution by Retrieving Web Images," in IEEE Transactions on Image Processing, vol. 22, No. 12, pp. 4865-4878, Dec. 2013, doi: 10.1109/TIP.2013.2279315. (Year: 2013).*

(Continued)

*Primary Examiner* — Emily C Terrell
*Assistant Examiner* — Julia Z. Yao
(74) *Attorney, Agent, or Firm* — Sughrue Mion, PLLC

(57) ABSTRACT

An apparatus for processing image data may include: a memory storing instructions; and a processor configured to execute the instructions to: extract a target image patch including a target object, from a captured image; obtain a plurality of landmark features from the target image patch; align the plurality of landmark features of the target image patch with a plurality of reference landmark features in a template image patch including the same target object; and when the plurality of landmark features are aligned with the plurality of reference landmark features, transfer texture details of the target object in the template image patch to the target object in the target image patch.

20 Claims, 20 Drawing Sheets

S132

(51) Int. Cl.
    *G06T 5/50* (2006.01)
    *G06T 7/33* (2017.01)
    *G06V 10/54* (2022.01)

(52) U.S. Cl.
    CPC .. *G06T 3/4053* (2013.01); *G06T 2207/20081* (2013.01); *G06T 2207/20084* (2013.01); *G06T 2207/20221* (2013.01)

(58) Field of Classification Search
    CPC .. G06V 10/245; G06V 10/248; G06V 10/443; G06V 10/82; G06V 20/00; G06V 20/80; G06V 10/422
    See application file for complete search history.

(56) References Cited

U.S. PATENT DOCUMENTS

| | | | |
|---|---|---|---|
| 11,127,164 | B2 | 9/2021 | Marks et al. |
| 2014/0099031 | A1* | 4/2014 | Brandt ............... G06V 10/7553 382/201 |
| 2014/0219526 | A1* | 8/2014 | Linguraru ............ G06V 40/174 382/128 |
| 2017/0083751 | A1 | 3/2017 | Tuzel et al. |
| 2017/0296841 | A1 | 10/2017 | Pekar et al. |
| 2018/0097972 | A1 | 4/2018 | Bourret |
| 2019/0378242 | A1 | 12/2019 | Zhang et al. |
| 2020/0117937 | A1* | 4/2020 | Lee ........................ G06T 7/12 |
| 2020/0175699 | A1 | 6/2020 | Wang |
| 2021/0256707 | A1 | 8/2021 | Brown et al. |
| 2021/0264161 | A1* | 8/2021 | Saraee ................ G06F 18/2413 |

OTHER PUBLICATIONS

Lourenco et al., "sRD-SIFT: Keypoint Detection and Matching in Images With Radial Distortion," in IEEE Transactions on Robotics, vol. 28, No. 3, pp. 752-760, Jun. 2012, doi: 10.1109/TRO.2012.2184952. (Year: 2012).*

Bavirisetti et al. Multi-scale Guided Image and Video Fusion: A Fast and Efficient Approach. Circuits Syst Signal Process 38, 5576-5605 (2019). https://doi.org/10.1007/s00034-019-01131-z (Year: 2019).*

Hannane et al. An efficient method for video shot boundary detection and keyframe extraction using SIFT-point distribution histogram. Int J Multimed Info Retr 5, 89-104 (2016). https://doi.org/10.1007/s13735-016-0095-6 (Year: 2016).*

Mitsa et al., "Image registration using elastic contours and internal landmarks," IMTC/98 Conference Proceedings. IEEE Instrumentation and Measurement Technology Conference. Where Instrumentation is Going (Cat. No. 98CH36222), 1998, pp. 451-455 vol. 1, doi: 10.1109/IMTC.1998.679827 [online]. (Year: 1998).*

Prematilake et al., "Evaluation and Prediction of Polygon Approximations of Planar Contours for Shape Analysis," arXiv, in Journal of Applied Statistics, 2017, vol. 45, issue 7 [online]. [retrieved on May 16, 2017]. Retrieved from the Internet <URL: https://doi.org/10.48550/arXiv.1705.05496> (Year: 2017).*

Chen et al., "2D facial landmark model design by combining key points and inserted points," in Expert Systems with Applications, 2015, vol. 42, issue 21, pp. 7858-7868 [online]. Retrieved from the Internet <URL: https://www.sciencedirect.com/science/article/pii/S0957417415004170> (Year: 2015).*

Iwata, "Placing landmarks suitably for shape analysis by optimization," Proceedings of the 21st International Conference on Pattern Recognition (ICPR2012), Tsukuba, Japan, 2012, pp. 2359-2362 [online]. Retrieved from the Internet <URL: https://ieeexplore.ieee.org/document/6460639> (Year: 2012).*

"What is the Moon Mode of Samsung mobiles and how to use it?", OneAndroid, 2021, pp. 1-6.

M., Mihai, "Did you know? Samsung's Galaxy camera app now has a "Moon Mode"", 2021 SamMobile, pp. 1-3.

Huanjing Yue et al., "Landmark Image Super-Resolution by Retrieving Web Images", IEEE Transactions on Image Processing, vol. 22, No. 12, Dec. 2013, (14 total pages).

International Search Report (PCT/ISA/210 and PCT/ISA/220) and Written Opinion (PCT/ISA/237) dated Dec. 9, 2022 issued by the International Searching Authority in International Application No. PCT/KR2022/014462.

* cited by examiner

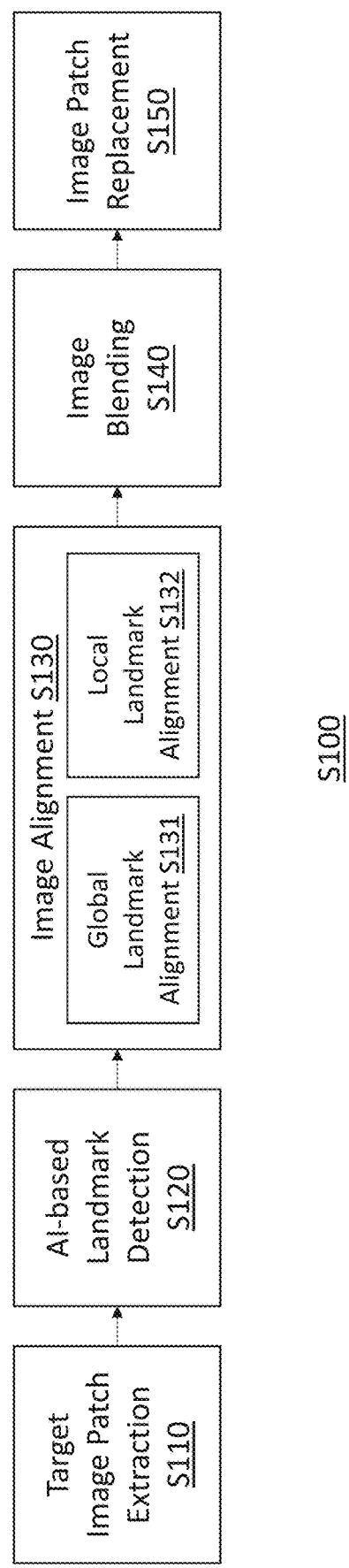

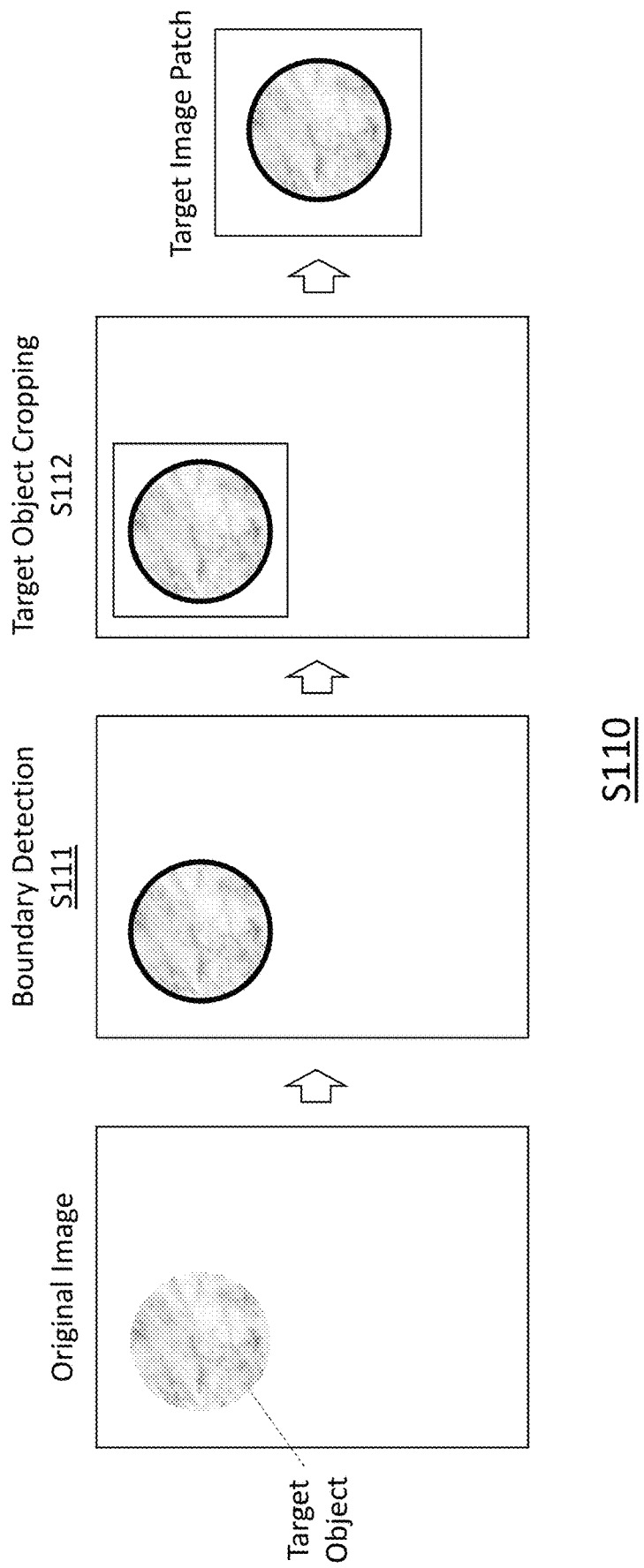

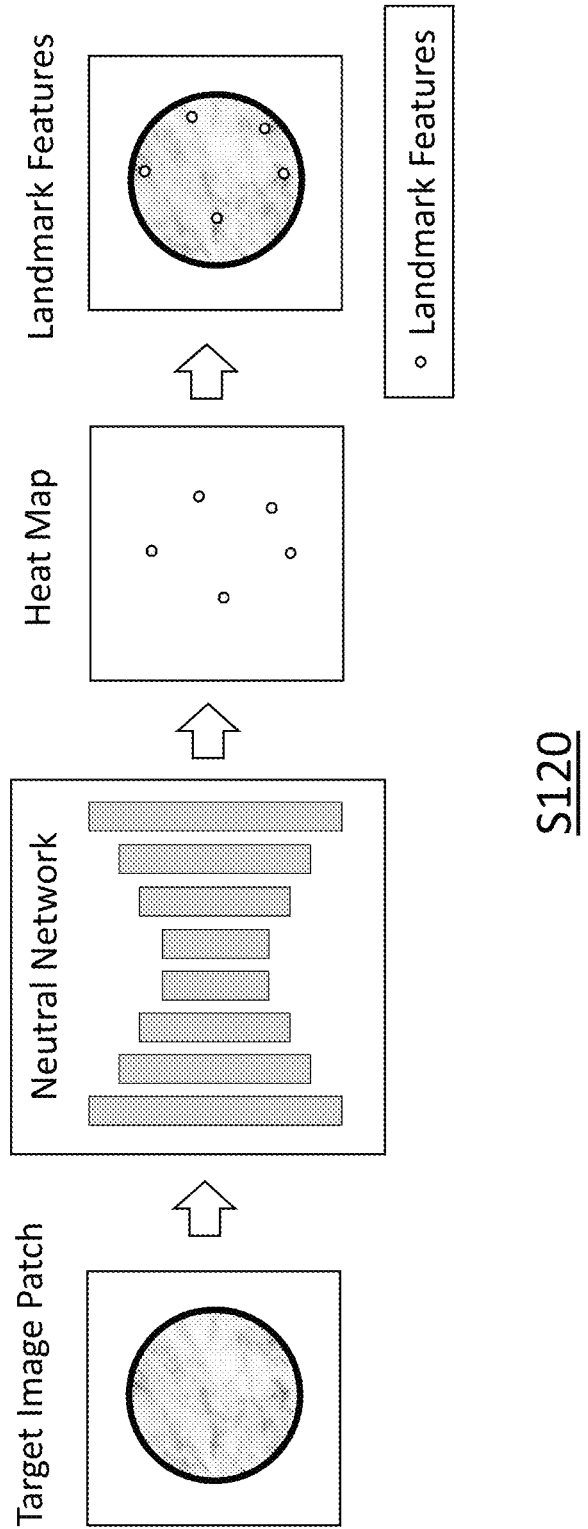

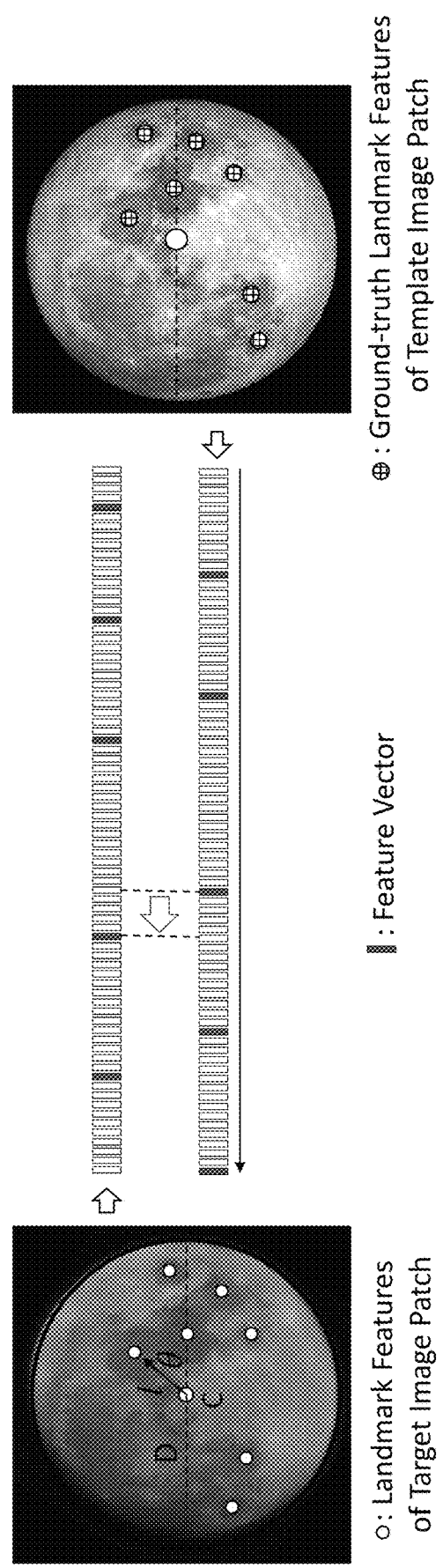

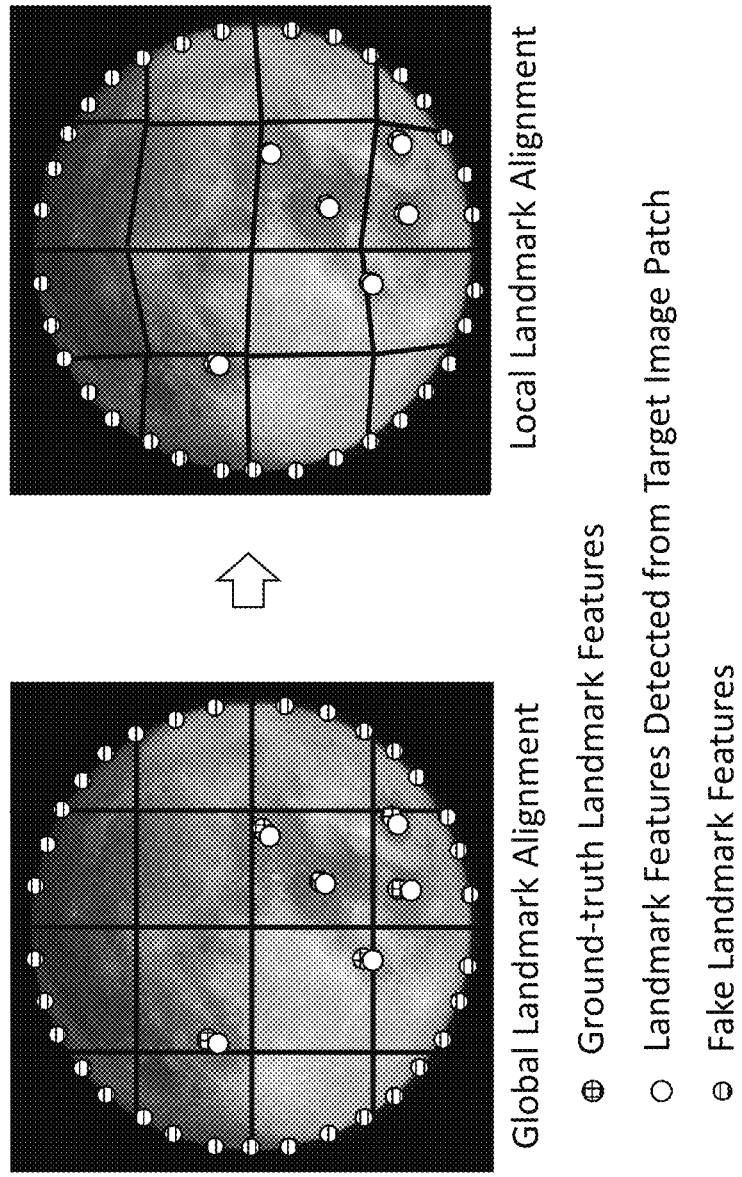

METHOD AND APPARATUS FOR ENHANCING TEXTURE DETAILS OF IMAGES

BACKGROUND

1. Field

The disclosure relates to a method and an apparatus for enhancing the quality of a low resolution image based on a high resolution template image using artificial intelligence (AI) technologies, and particularly transferring texture details of a target object in the template image to a target object in a target image.

2. Description of Related Art

Digital cameras and smartphone cameras have evolved and improved over the past decades, to the extent that users are able to shoot a so-called "professional" moon shot using a smartphone camera with minimum effort.

A Dedicated Moon Shot mode has been developed to help common users take better moon pictures with a single click. However, to capture a high quality moon picture, at least 50× digital zoom setting may be required in a camera application. Also, with such a large zoom scale, conventional image up-sampling and super-resolution methods may not be able to fully recover the texture details of the moon surface.

SUMMARY

In accordance with an aspect of the disclosure, there is provided an apparatus for processing image data, the apparatus including: a memory storing instructions; and a processor configured to execute the instructions to: extract a target image patch including a target object, from a captured image; obtain a plurality of landmark features from the target image patch; align the plurality of landmark features of the target image patch with a plurality of reference landmark features in a template image patch including the same target object; and when the plurality of landmark features are aligned with the plurality of reference landmark features, transfer texture details of the target object in the template image patch to the target object in the target image patch.

The processor may be further configured to obtain a plurality of landmark features using a neural network that is trained to predict a heat map indicting landmark positions in an image, by minimizing loss between the predicted heat map and a ground-truth heat map.

The processor may be further configured to execute the instructions to: compute a rotation offset of the plurality of landmark features of the target image patch in comparison with the plurality of reference landmark features; and perform a global alignment on the target image patch by rotating the target image patch by the rotation offset.

Each of the plurality of landmark features is represented as a rotation angle with respect to a reference point and a reference line, and a ratio of a distance from each of the plurality of landmark features to the reference point, to a radius of a circle that surrounds a boundary of the target object.

The target object may be a moon, the reference point may be a center of the moon in the target image patch, the reference line may be a symmetry line that crosses the center of the moon in the target image patch, and the radius of the circle may be a radius of the moon captured in the target image patch.

The processor may be further configured to execute the instructions to: after the global alignment, perform a local alignment on the target image patch by matching the plurality of landmark features to the plurality of reference landmark features while maintaining a boundary shape of the target object in the target image patch.

The processor may be further configured to execute the instructions to: add a plurality of fake landmarks along a boundary of the target object to maintain the boundary shape of the target object in the target image patch.

A ratio of a number of the plurality of fake landmarks to a number of the plurality of landmark features in the target image patch may be lower than 5.

The processor may be further configured to execute the instructions to: transfer the texture details of the template image patch by blending a target luma detail layer of the target image patch with a template luma detail layer of the template image patch, based on an alpha map that is obtained from the target image patch.

The processor is further configured to execute the instructions to: when extracting the target image patch from the captured image, identify pixel coordinates of the target image patch in the captured image, and replace the target image patch in the capture image, with the target image patch into which the texture details of the template image patch are transferred, based on information of the pixel coordinates of the target image patch in the captured image.

In accordance with another aspect of the disclosure, there is provided a method for processing image data, the method including: extracting a target image patch including a target object, from a captured image; obtaining a plurality of landmark features from the target image patch; aligning the plurality of landmark features of the target image patch with a plurality of reference landmark features in a template image patch including the same target object; and when the plurality of landmark features are aligned with the plurality of reference landmark features, transferring texture details of the target object in the template image patch to the target object in the target image patch.

The obtaining the plurality of landmark features may include: obtaining the plurality of landmark features using a neural network that is trained to predict a heat map indicating landmark positions in an image, by minimizing loss between the predicted heat map and a ground-truth heat map.

The aligning the plurality of landmark features of the target image patch may further include: computing a rotation offset of the plurality of landmark features of the target image patch in comparison with the plurality of reference landmark features; and performing a global alignment on the target image patch by rotating the target image patch by the rotation offset.

Each of the plurality of landmark features may be represented as a rotation angle with respect to a reference point and a reference line, and a ratio of a distance from each of the plurality of landmark features to the reference point, to a radius of a circle that surrounds a boundary of the target object.

The target object may be Moon, the reference point may be a center of the Moon in the target image patch, the reference line may be a symmetry line that crosses the center of the Moon in the target image patch, and the radius of the circle may be a radius of the Moon captured in the target image patch.

The method may further include: after the global alignment, performing a local alignment on the target image patch by matching the plurality of landmark features to the plurality of reference landmark features while maintaining a boundary shape of the target object in the target image patch.

The performing the local alignment may include: adding a plurality of fake landmarks along a boundary of the target object to maintain the boundary shape of the target object in the target image patch.

The transferring the texture details of the target object may include: transferring the texture details of the template image patch by blending a target luma detail layer of the target image patch with a template luma detail layer of the template image patch, based on an alpha map that is obtained from the target image patch.

The method may further include: when extracting the target image patch from the captured image, identifying pixel coordinates of the target image patch in the captured image, and replacing the target image patch in the capture image, with the target image patch into which the texture details of the template image patch are transferred, based on information of the pixel coordinates of the target image patch in the captured image.

In accordance with another aspect of the disclosure, there is provided a non-transitory computer readable storage medium storing a program to be executable by at least one processor to perform a method for processing image data, the method including: extracting a target image patch including a target object, from a captured image; obtaining a plurality of landmark features from the target image patch; aligning the plurality of landmark features of the target image patch with a plurality of reference landmark features in a template image patch including the same target object; and when the plurality of landmark features are aligned with the plurality of reference landmark features, transferring texture details of the target object in the template image patch to the target object in the target image patch.

The obtaining the plurality of landmark features may further include: obtaining the plurality of landmark features using a neural network that is trained to predict a heat map indicating landmark positions in an image, by minimizing loss between the predicted heat map and a ground-truth heat map.

BRIEF DESCRIPTION OF THE DRAWINGS

The above and other aspects, features, and advantages of embodiments of the disclosure will be more apparent from the following description taken in conjunction with the accompanying drawings, in which:

FIG. 1 is a diagram illustrating a method of enhancing texture details of a target object captured in an original image, according to embodiments;

FIG. 2 is a diagram illustrating a method of extracting a target image patch from an original image, according to embodiments;

FIGS. 3A and 3B are diagrams illustrating a method of detecting landmark features, according to embodiments.

FIG. 6 illustrates a method of performing global alignment on landmark features of the target image patch, according to embodiments;

FIG. 7 illustrates a method of performing local alignment on landmark features of the target image patch, according to embodiments;

DETAILED DESCRIPTION

Figure 3B:
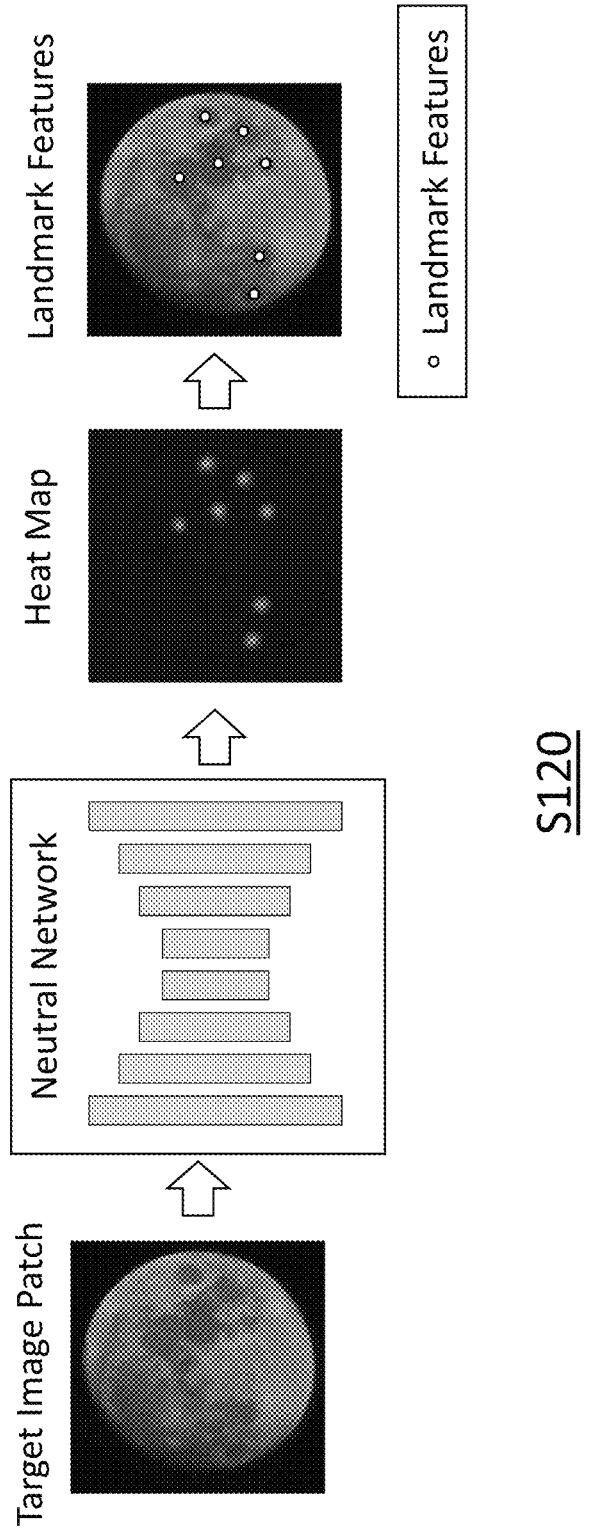

Embodiments described herein provide a method and an apparatus for transferring texture details from a high resolution template image to a low resolution image using a neural network model to enhance the quality of the low resolution image.

According to embodiments of the present disclosure, a moon patch is extracted from an original image capturing the moon, and moon landmark detection is performed on the moon patch using an AI neural network, given the uniqueness of the moon's appearance. The extracted moon patch is aligned with a template moon patch using the detected moon landmarks, through a two-step alignment procedure including a global alignment step and a local alignment step. Once the extracted moon patch is aligned with the temple moon patch, the rich texture details of the moon surface in the template moon patch are transferred to the original moon patch using a linear blending method.

Example embodiments are described in greater detail below with reference to the accompanying drawings.

FIG. 1 is a diagram illustrating a method S100 of enhancing texture details of a target object captured in an original (low resolution) image, according to embodiments. Operations S110-S150 illustrated in FIG. 1 may be performed by at least one processor included in any type of electronic device, for example, a smartphone, a laptop computer, a personal computer (PC), a smart television, a server, and the like.

As shown in FIG. 1, the method S100 includes operation S110 of extracting a target image patch from an original image, operation S120 of detecting landmark features from the target image patch using an artificial intelligence (AI) technology, operation S130 of aligning the target image patch with a template image patch, operation S140 of blending the target image patch with the template image patch to acquire an enhanced target image patch, and operation S150 of replacing the original target image patch with the enhanced target image patch in the original image.

Specifically, in operation S110, the method S100 includes detecting the boundaries of a target object from the original image, by identifying edges at which image brightness changes sharply. When there are points having discontinuities in depth, discontinuities in surface orientation, changes in material properties, and/or variations in scene illumination, in the original image, such points may be identified as edges corresponding to the boundaries of the target object.

Once the boundaries of the target object are detected, an area including the target object is cropped from the original image, to obtain a target image patch. When the target image patch is cropped from the original image, position information (e.g., x and y coordinates) of the target image patch in the original image is obtained and stored. Based on the position information, the (original) target image patch is replaced with an enhanced target image patch in the original image, after the target image patch is converted into the enhanced target image patch. Operation S110 will be further described later with reference to FIG. 2.

In operation S120, the method S100 includes detecting a plurality of landmark features from the target image patch, using a neural network which has been trained to output a prediction of a heat map of landmarks (a two-dimensional heat map of moon landmarks), using a ground-truth heat map. The ground-truth heat map is rendered using manually annotated ground-truth landmark locations. A loss function of the neural network calculates a per-pixel difference between the predicted heat map and the ground-truth heat map. The neural network is trained to minimize the per-pixel difference between the predicted heat map and the ground-truth heat map, for example, using a mean-square error (MSE). Once the predicted heat map of landmarks is obtained from the neural network, a post-processing step may be performed to obtain the locations of the landmarks (e.g., pixel coordinates of the landmarks) from the predicted heat map.

The term "ground-truth landmarks" may be also referred to as "reference landmarks" or "reference landmark features." Training images may include the entire portion of the target object (e.g., a full moon image) or may include a partial portion of the target object (e.g., a half-moon image, a crescent moon image, etc.), so that the trained neural network may detect landmark features from an image including only a part of the target object (e.g., a crescent moon image).

The structure of the neural network will be described later with reference to FIGS. 4 and 5A-5E.

Operation S130 includes operation S131 of performing global alignment on the landmark features of the target image patch with respect to the ground-truth landmark features of the template image, and operation S132 of performing local alignment on the landmark features of the target image patch.

In operation S131, the similarity between the landmark features of the target image patch and the ground-truth landmark features of the template image are calculated, and the landmark features of the target image patch are shifted or rotated to be aligned with the ground-truth landmark features of the template image in a direction in which the similarity increases. The similarity may be expressed as a rotation offset of the landmark features of the target image patch in comparison with the ground-truth landmark features. The target image patch may be rotated to reduce the rotation offset below a threshold offset value. For example, the target image patch may be rotated by the rotation offset, so that the rotation offset becomes zero.

In an example, an average mean square error between the landmark features of the target image patch and the ground-truth landmark features of the template image may be computed as a value representing the similarity. The landmark features may be expressed as feature vectors, each having a magnitude and a direction, that indicate the distance between a reference point and each of the landmark features, and the direction from the reference point to each of the landmark features, respectively. The target image patch (and the landmark features as a group) are shifted or rotated by one degree at a time, in a stepwise manner, to find the best match that maximizes the similarity (or that minimizes the average mean square error). In such a manner, the target image patch is rotated by a certain degree that maximizes the similarity between the landmark features of the target image patch and the ground-truth landmark features of the template image. Operation S131 will be further described with reference to FIG. 6.

Once the landmark features of the target image patch are globally aligned with the ground-truth landmark features of the template image, the landmark features of the target image patch are locally aligned with the ground-truth landmark features of the template image, in operation S132.

For example, a distance thresholding method is applied to match the landmark features of the target image patch to the ground-truth landmark features of the template image. The target image patch may be divided into a plurality of sections, and when the distances between the landmark features of the target image patch and the ground-truth landmark features of the template image are greater than a pre-set threshold value, the landmark features of the target image patch are determined as misaligned features and the sections of the target image patches including the misaligned features are transformed so that the landmark features of the target image patch overlap with the ground-truth landmark features of the template image.

In operation S132, fake landmark features may be placed along the boundaries of the target object in the target image patch, to maintain the global shape of the target object during the local alignment. Operation S132 will be further described later with reference to FIG. 7.

Once the landmark features of the target image patch are globally and locally aligned with the ground-truth landmark features of the template image, operation S140 is performed to blend the target image patch with the template image.

In operation S140, texture details of the target object in the template image are transferred to the target image patch, for example, using a linear blending method, to generate an enhanced target image patch. Operation S140 will be further described later with reference to FIG. 8.

In operation S150, the enhanced target image patch is inserted into the original image at the position of the original target image patch, to replace the original target image with the enhanced target image patch. Operation S150 will be further described later with reference to FIG. 9.

FIG. 2 is a diagram illustrating a method of extracting a target image patch from an original image, according to embodiments. The method shown in FIG. 2 may correspond to operation S110 of FIG. 1.

As shown in FIG. 2, when a target object is captured by a camera in an original image, a target image patch is extracted from the original image, to enhance the texture details of the target object, based on a template image that includes the same target object and has a higher resolution than the original image. According to embodiments of the present disclosure, texture details of any type or any kind of target object (e.g., a moon, a historical building, famous architecture, a national flag, etc.) can be improved if a higher resolution template image including the same target object is provided. In an embodiment, landmark features are detected from the original image using an AI technology, and are aligned with ground-truth landmark features of the template image through a two-step image alignment (e.g., global alignment and local alignment) so that texture details are transferred from the template image to the original image to enhance the quality of the original image. The original image does not necessarily have to capture the entire portion of the target object, and may include either the entire portion or a partial portion of the target object.

The target object may be detected from an original image using an edge detection technology, in operation S111. A plurality of points that have discontinuities in depth, discontinuities in surface orientation, changes in material properties, and/or variations in scene illumination, and form a continuous line, are identified as edges corresponding to the boundaries of the target object. In turn, a target image patch including the target object is cropped out of the original image, in operation S112. The x and y coordinates of the target image patch are stored, to later perform operation S150 of the image patch replacement.

FIGS. 3A and 3B are diagrams illustrating a method of detecting landmark features, according to embodiments. In particular, FIG. 3B shows that the target object is the moon. The method shown in FIG. 3 may correspond to operation S120 of FIG. 1.

As shown in FIGS. 3A and 3B, a plurality of landmark features are detected from the target image patch, using a neural network which has been trained to output a prediction of a heat map of landmarks (a two-dimensional heat map of moon landmarks), using a ground-truth heat map. The ground-truth heat map is rendered using manually annotated ground truth landmark locations. A loss function of the neural network calculates a per-pixel difference between the predicted heat map and the ground-truth heat map. The neural network is trained to minimize the per-pixel difference between the predicted heat map and the ground-truth heat map, for example, using a mean-square error (MSE). Once the predicted heat map of landmarks is obtained from the neural network, a post-processing step may be performed to obtain locations of the landmarks (e.g., pixel coordinates of the landmarks) from the predicted heat map.

Figure 4:
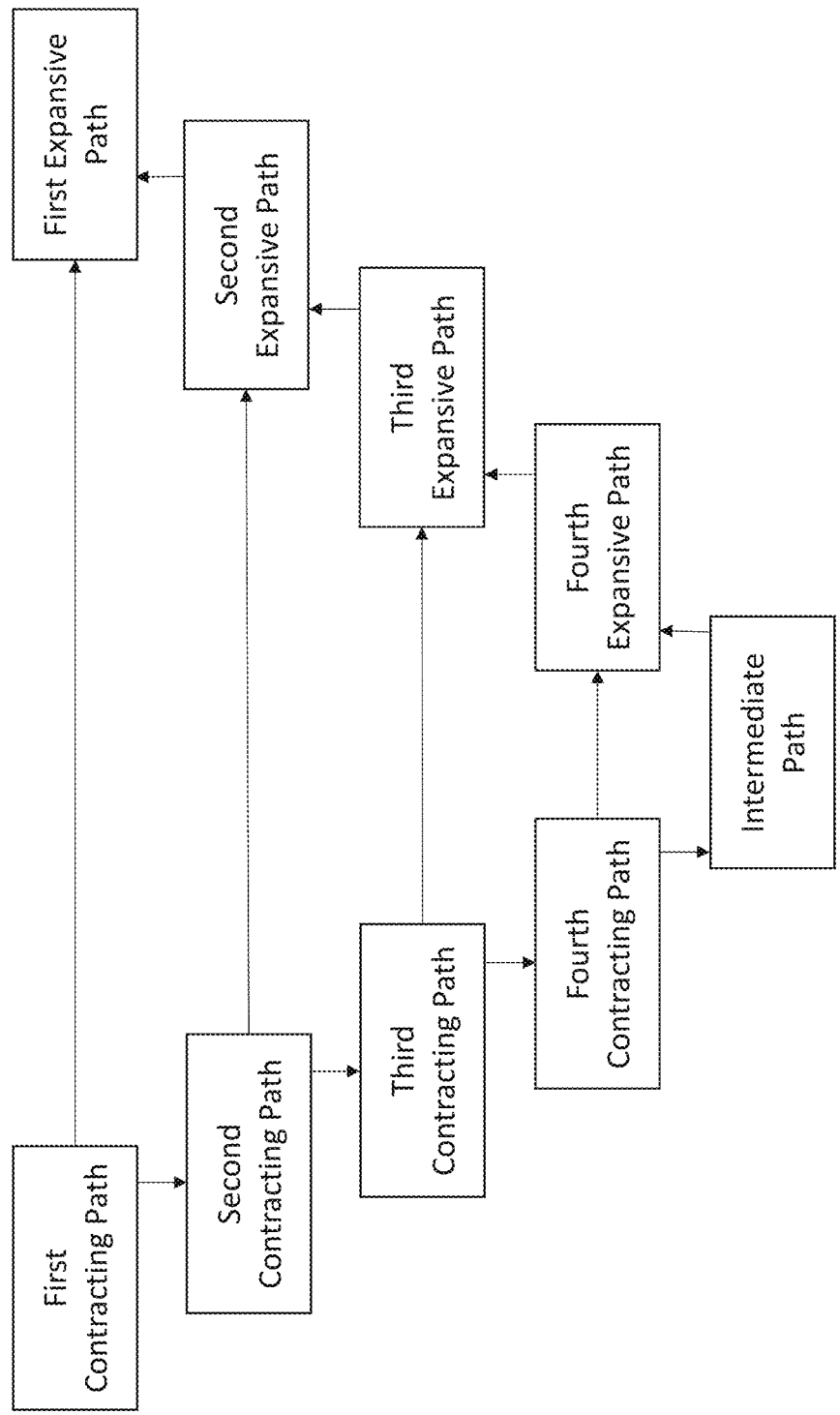
FIG. 4 is a diagram illustrating an overall structure of a neural network, according to embodiments.

FIG. 4 is a diagram illustrating an overall structure of the neural network, according to embodiments.

As shown in FIG. 4, the neural network has a contracting path, an expansive path, and an intermediate path between the contracting path and the expansive path. The target image patch passes through the contracting path, the intermediate path, and the expansive path, to generate a heat map identifying landmark features in the target image patch that correspond to ground-truth landmark features in the template image.

The contracting path may be formed by a plurality of contracting paths, including a first contracting path to a fourth contracting path. The target image patch may pass through the contracting path, in the order of the first, the second, the third, and the fourth contracting paths. In each contracting path, two or more convolutional layers (e.g., 3×3 convolutional layers), each followed by an activation function layer (e.g., a rectified linear unit (ReLU) activation layer), and a max pooling layer (e.g., a 2×2 max pooling layer) with a stride greater than 1, are provided for downsampling. The number of feature channels may be doubled in each contracting path.

The expansive path may be formed by a plurality of expansive paths, including a first expansive path to a fourth expansive path. The first expansive path to the fourth expansive path correspond to the first contracting path to the fourth contracting path, respectively. The target image patch may pass through the expansive path, in the order of the fourth, the third, the second, and the first contracting paths.

In each expansive path, an up-convolutional layer is followed by a concatenation layer, and two or more convolutional layers (e.g., 3×3 convolutional layers), each followed by an activation function layer (e.g., a ReLU activation layer). The up-convolutional layer reduces the number of feature channels (e.g., a 2×2 up-convolutional layer that halves the number of feature channels). The concatenation layer concatenates an output of the up-convolutional layer with an output from a corresponding contracting path. The heat map illustrated in FIGS. 3A and 3B may correspond to the output of the first expansive path.

The intermediate path provided between the contracting path and the expansive path may consist of two or more convolutional layers, each followed by an activation function layer (e.g., a ReLU activation layer).

FIGS. 5A-5E are diagrams illustrating a detailed structure of the neural network structure according to embodiments.

Figure 5A:
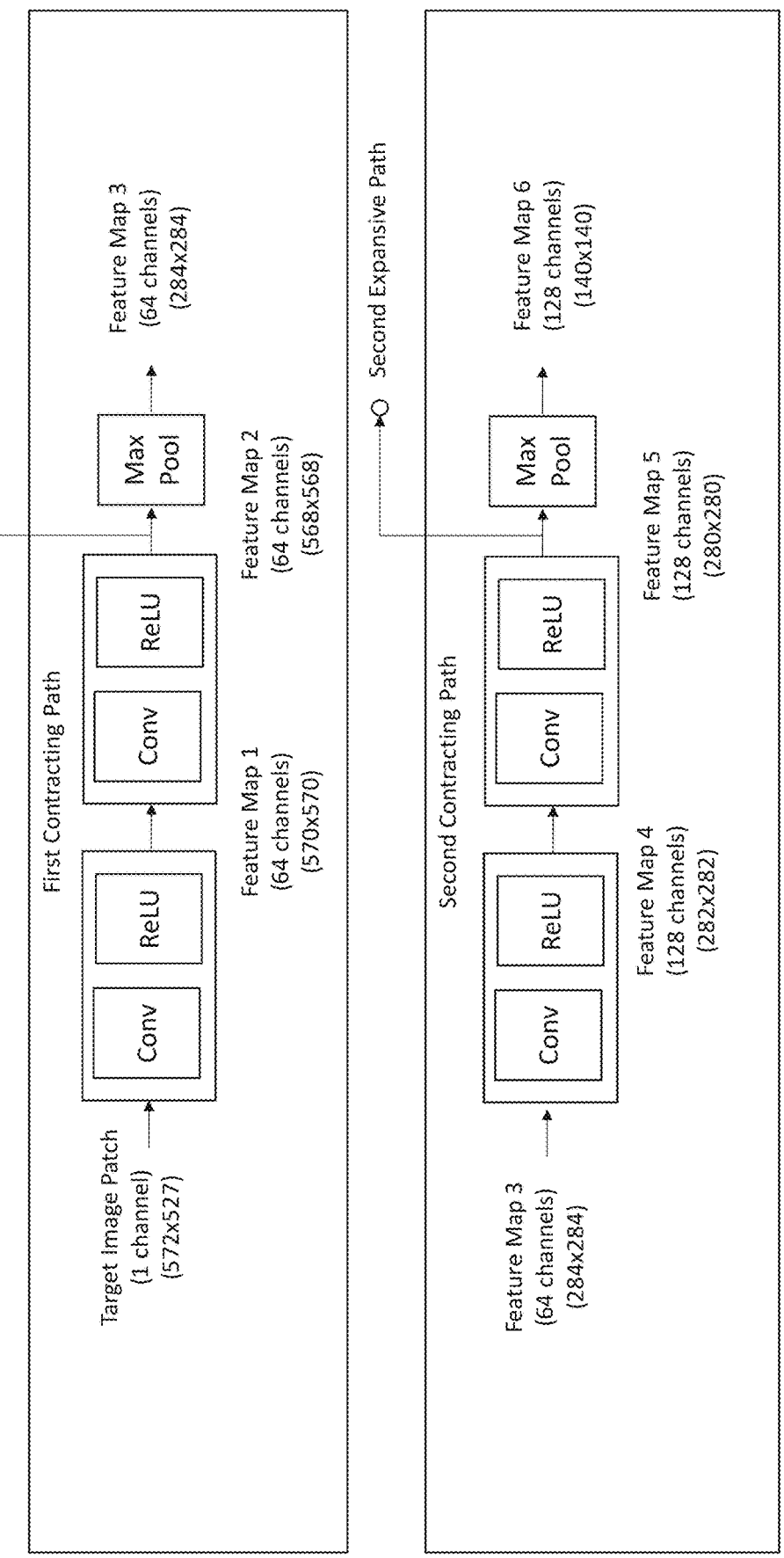
FIGS. 5A-5E are diagrams illustrating a detailed structure of the neural network structure according to embodiments.

As shown in FIG. 5A, the first contracting path includes two convolutional layers, each followed by a ReLU activation layer. When the target image patch has one feature channel and 572×527 pixels in an X and Y dimension, a first set of a convolutional layer and a ReLU activation layer may convert the target image patch to feature map 1 having 64 feature channels and 570×570 pixels. A second set of a convolutional layer and a ReLU activation layer may convert feature map 1 having 64 feature channels and 570×570 pixels, into feature map 2 having 64 feature channels and 568×568 pixels. The convolutional layers perform convolution on a preset number of adjacent pixels, or a preset number of pixels that are spaced apart from each other by a certain interval, by using a filter kernel.

Feature map 2 is input to a max pooling layer configured to reduce the spatial resolution of feature map 2 to feature map 3 having 64 feature channels and 284×284 pixels. Additionally, feature map 2 is copied and provided to the first expansive path to be concatenated with an output of an up-convolutional layer in the first expansive path.

The second contracting path includes two convolutional layers, each followed by a ReLU activation layer. A first set of a convolutional layer and a ReLU activation layer in the second contracting path may convert the third feature map having 64 feature channels and 284×284 pixels, into feature map 4 having 128 feature channels and 282×282 pixels. A second set of a convolutional layer and a ReLU activation layer may convert feature map 4 having the 128 feature channels and the 282×282 pixels, into feature map 5 having the 128 feature channels and 280×280 pixels.

Feature map 5 is input to a max pooling layer configured to reduce the spatial resolution of feature map 5 to feature map 6 having 128 feature channels and 140×140 pixels. Additionally, feature map 5 is copied and provided to the second expansive path to be concatenated with an output of an up-convolutional layer in the second expansive path.

Figure 5B:
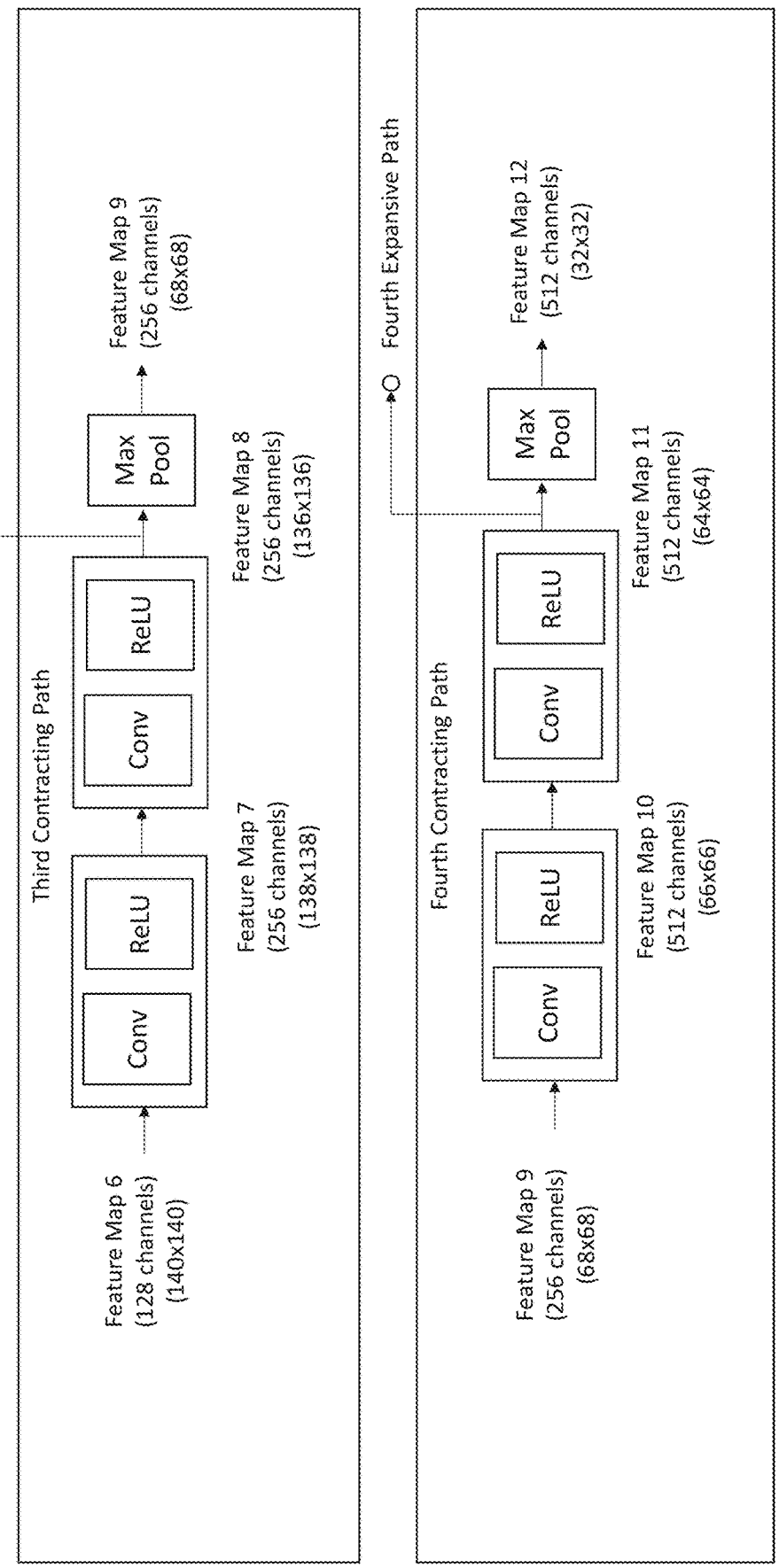

As shown in FIG. 5B, the third contracting path includes two convolutional layers, each followed by a ReLU activation layer. A first set of a convolutional layer and a ReLU activation layer in the third contracting path may convert feature map 6 having 128 feature channels and 140×140 pixels, into feature map 7 having 256 feature channels and 138×138 pixels. A second set of a convolutional layer and a ReLU activation layer may convert feature map 7 having 256 feature channels and 138×138 pixels, into feature map 8 having 256 feature channels and 136×136 pixels.

Feature map 8 is input to a max pooling layer configured to reduce the spatial resolution of feature map 8 to feature map 9 having the 256 feature channels and 68×68 pixels. Additionally, feature map 8 is copied and provided to the third expansive path to be concatenated with an output of an up-convolutional layer in the third expansive path.

The fourth contracting path includes two convolutional layers, each followed by a ReLU activation layer. A first set of a convolutional layer and a ReLU activation layer in the fourth contracting path may convert feature map 9 having the 256 feature channels and the 68×68 pixels, into feature map 10 having the 512 feature channels and 66×66 pixels. A second set of a convolutional layer and a ReLU activation layer may convert feature map 10 having the 512 feature channels and the 66×66 pixels, into feature map 11 having 512 feature channels and 64×64 pixels.

Feature map 11 is input to a max pooling layer configured to reduce the spatial resolution of feature map 11 to feature map 12 having 512 feature channels and 32×32 pixels. Additionally, feature map 11 is copied and provided to the fourth expansive path to be concatenated with an output of an up-convolutional layer in the fourth expansive path.

Figure 5C:
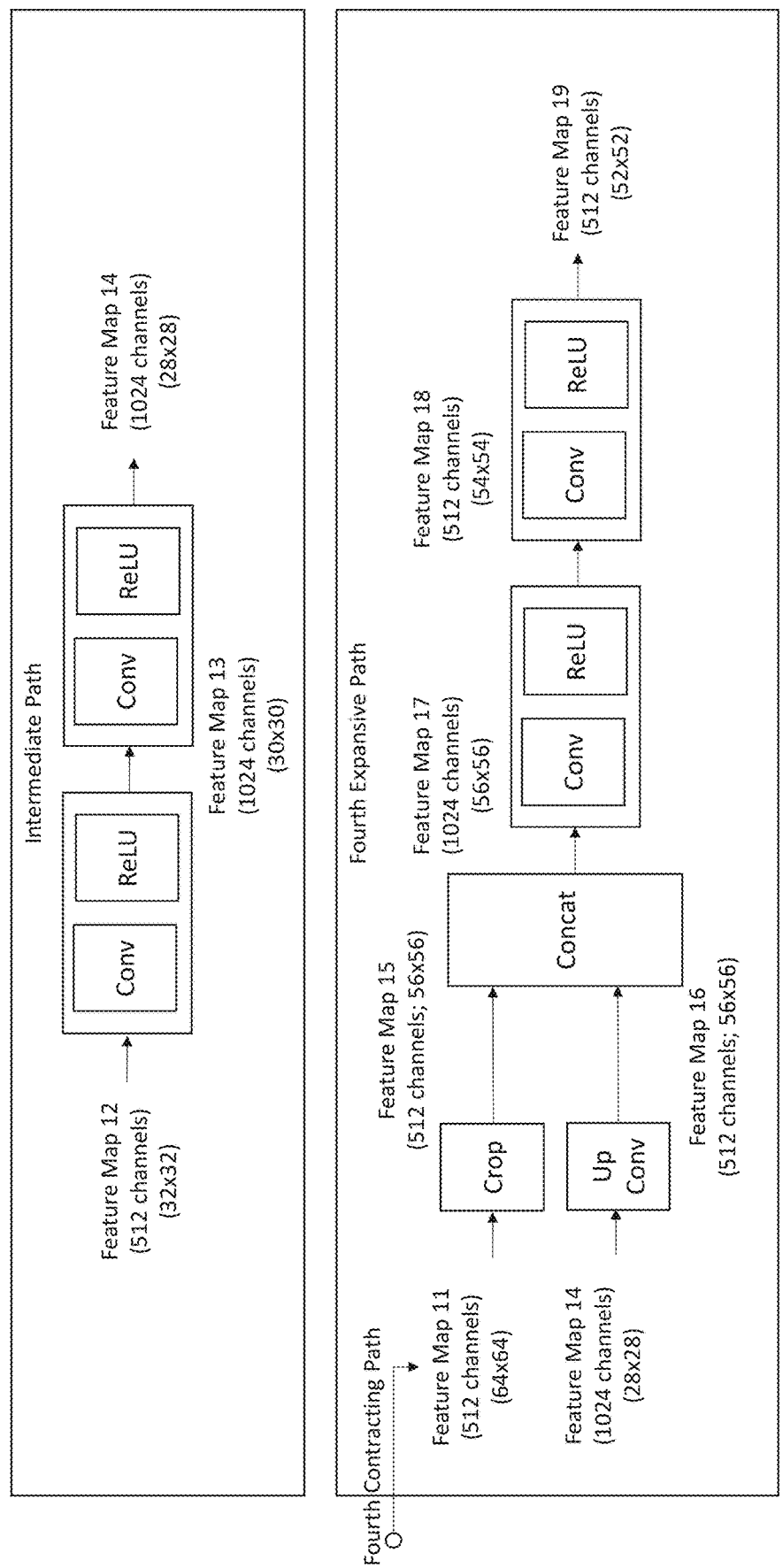

As shown in FIG. 5C, the intermediate path includes two convolutional layers, each followed by a ReLU activation layer. A first set of a convolutional layer and a ReLU activation layer in the intermediate path may convert feature map 12 having 512 feature channels and 32×32 pixels, into feature map 13 having 1024 feature channels and 30×30 pixels. A second set of a convolutional layer and a ReLU activation layer may convert feature map 13 having 1024 feature channels and 30×30 pixels, into feature map 14 having 1024 feature channels and 28×28 pixels.

Referring to FIG. 5C, in the fourth expansive path corresponding to the fourth contracting path, feature map 11 is received from the fourth contracting path, and feature map 14 is received from its preceding path, that is, the intermediate path.

Feature map 11 having 512 feature channels and 64×64 pixels is cropped to obtain feature map 15 having 512 feature channels and 56×56 pixels. Up-convolution is performed on feature map 14 to obtain feature map 16 having 512 feature channels and 56×56 pixels.

Feature map 15 and feature map 16 are concatenated as feature map 17 having 1024 channels and 56×56 pixels.

Feature map 17 is converted into feature map 18 having 512 channels and 54×54 pixels, through a first set of a convolutional layer and a ReLU activation layer.

Feature map 18 is converted into feature map 19 having 512 channels and 52×52 pixels, through a second set of a convolutional layer and a ReLU activation layer.

Figure 5D:
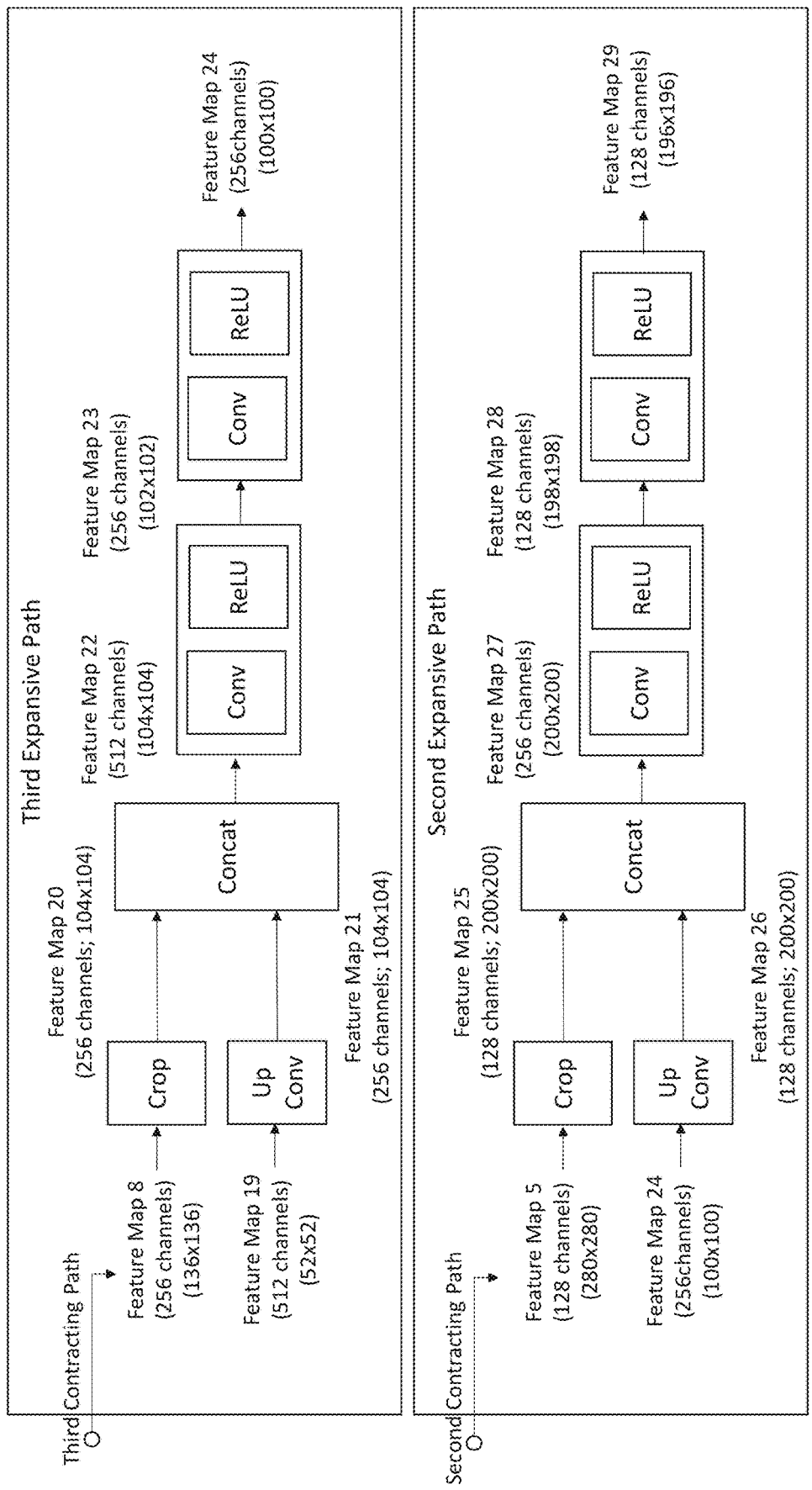

As shown in FIG. 5D, in the third expansive path corresponding to the fourth contracting path, feature map 8 is received from the third contracting path, and feature map 19 is received from its preceding path, that is, the fourth expansive path.

The third expansive path includes a cropping operation to crop feature map 8 having 256 channels and 136×136 pixels, to obtain feature map 20 having 256 channels and 104×104 pixels, and an up-convolutional layer configured to convert feature map 19 having 512 channels and 52×52 pixels into feature map 21 having 256 channels and 104×104 pixels.

The third expansive path further includes a concatenation layer configured to concatenate feature map 20 with feature map 21 to obtain feature map 22 having 512 channels and 104×104 pixels, a first set of a convolutional layer and a ReLU activation layer configured to convert feature map 22 into feature map 23 having 256 channels and 102×102 pixels, and a second set of a convolutional layer and a ReLU activation layer configured to convert feature map 23 into feature map 24 having 256 channels and 100×100 pixels.

Referring to FIG. 5D, in the second expansive path corresponding to the second contracting path, feature map 5 is received from the second contracting path, and feature map 24 is received from its preceding path, that is, the third expansive path.

The second expansive path includes a cropping operation to crop feature map 5 having 128 channels and 280×280 pixels, to obtain feature map 25 having 128 channels and 200×200 pixels, and an up-convolutional layer configured to convert feature map 24 having 256 channels and 100×100 pixels into feature map 26 having 128 channels and 200×200 pixels.

The second expansive path further includes a concatenation layer configured to concatenate feature map 25 with feature map 26 to obtain feature map 27 having 256 channels and 200×200 pixels, a first set of a convolutional layer and a ReLU activation layer configured to convert feature map 27 into feature map 28 having 128 channels and 198×198 pixels, and a second set of a convolutional layer and a ReLU activation layer configured to convert feature map 28 into feature map 29 having 128 channels and 196×196 pixels.

Figure 5E:
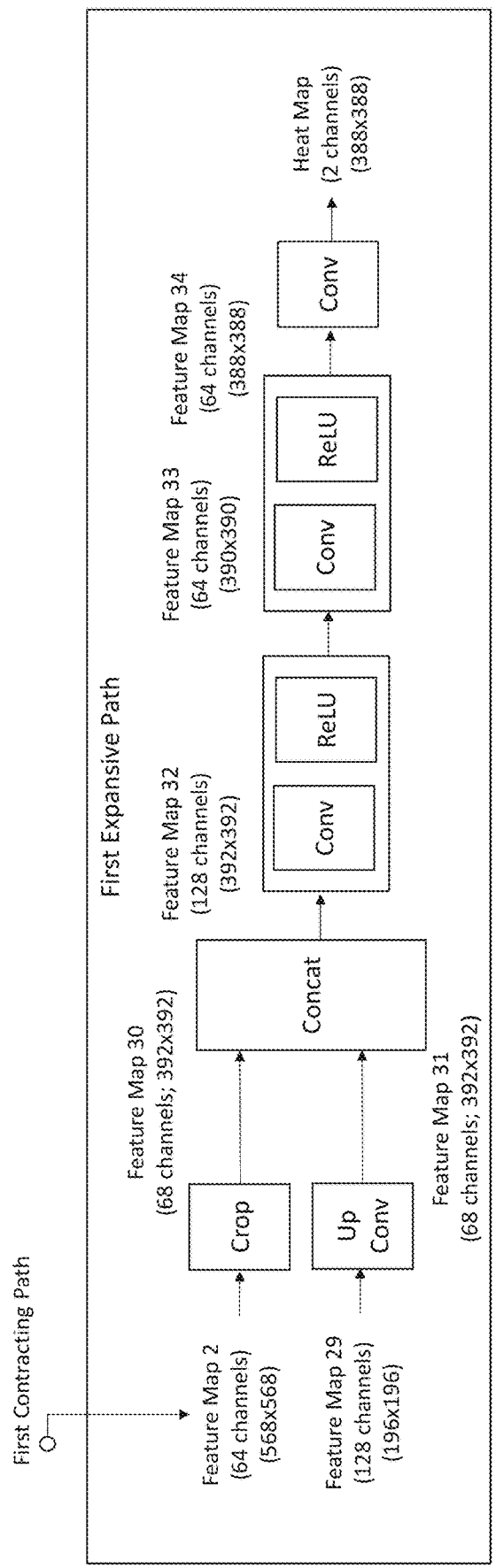

As shown in FIG. 5E, the first expansive path corresponding to the first contracting path, receives feature map 2 from the first contracting path, and receives feature map 24 from its preceding path, that is, the second expansive path.

The first expansive path includes a cropping operation to crop feature map 2 having 64 channels and 568×568 pixels, to obtain feature map 30 having 68 channels and 392×392 pixels, and an up-convolutional layer configured to convert feature map 29 having 68 channels and 392×392 pixels into feature map 32 having 128 channels and 392×392 pixels.

The first expansive path further includes a concatenation layer configured to concatenate feature map 30 with feature map 31 to obtain feature map 32 having 128 channels and 392×392 pixels, a first set of a convolutional layer and a ReLU activation layer configured to convert feature map 32 into feature map 33 having 64 channels and 390×390 pixels, a second set of a convolutional layer and a ReLU activation layer configured to convert feature map 33 into feature map 34 having 64 channels and 388×388 pixels, and an additional convolutional layer configured to convert feature map 24 to a heat map including 2 channels and 388×388 pixels. The heat map output from the first expansive path may correspond to the heat map illustrated in FIG. 3A or 3B.

The heat map provides a list of locations of landmark features identified from the target image patch.

In FIGS. 5A through 5E, the neural network is implemented with a ReLU activation layer and a pooling layer with a stride of 2, but the type of the activation function is not limited to a ReLU activation function, and the stride setting may be changed. For example, another non-linear activation function, such as a Sigmoid activation function, a hyperbolic tangent activation function, and a Softmax activation function, may be used instead of the ReLU activation function. Further, the number of the sub-contracting paths and the sub-expansive paths may be changed, and the number of convolutional layers in each of the sub-contracting paths and the sub-expansive paths may be changed as well.

FIG. 6 illustrates a method of globally aligning landmark features of the target image path with ground-truth landmark features of the template image, according to embodiments. The method shown in FIG. 6 may correspond to operation S131 of FIG. 1.

The global alignment of the landmark features may be performed on the landmark features, using a list of the landmark feature locations which are identified from the heat map. The landmark feature locations may not have semantic meanings, and therefore their relative spatial locations may be used as a group, to align the set of the landmark feature locations with a set of ground-truth landmark feature locations identified from the template image.

According to embodiments, landmark feature vectors corresponding to the landmark features of the target image patch are identified, using a reference line D that passes through a reference point C, for example, the centroid of the target object. For example, the target object may have a shape of a circle, like the moon, the reference point C and the reference line D may correspond to the center of the circle and any straight line segment that passes through the center of the circle and whose endpoints lie on the circle, respectively. In the target patch image shown in FIG. 6, a horizontal line that passes through the center of the moon image is used as the reference line D. Each of the landmark feature vectors is represented as a 360-dimensional vector having a magnitude l indicating a distance from the reference point C to the landmark feature vector, and a rotation angle θ indicating an angle between the reference line D and a vector line extending from the reference point C to the landmark feature vector.

For each of the plurality of landmark features in the target image patch, the rotation angle θ is calculated with respect to the reference point C and the reference line D. Also, a ratio l/r of the distance l from the reference point C to the landmark feature vector, to a radius r of the target object in the target image patch, is calculated. The value of the ratio l/r at the rotation angle θ is set as the feature vector for each of the plurality of landmark features, and each of the feature vectors are arranged in a 1D vector space, as shown in FIG. 6. One dimensional (1D) filter may be applied to the feature vectors to increase the tolerance of detection errors.

Once the feature vectors of the landmark features are identified from the target image patch, the identified feature vectors of the landmark features are compared with pre-calculated feature vectors of the ground-truth landmark features.

The similarity between the feature vectors of the target image patch and the pre-calculated feature vectors of the template image is computed. The similarity may be expressed as a rotation offset between the feature vectors of the target image patch and the pre-calculated feature vectors of the template image. The target image patch (and the landmark features as a group) are rotated or shifted to be aligned with the pre-calculated feature vectors of the template image in a direction in which the similarity increases, and in a direction in which the rotation offset decreases below a threshold offset value.

In an example, an average mean square error between the feature vectors of the target image patch and the pre-calculated feature vectors of the template image is computed as a value representing the similarity. When the similarity is greater than a threshold similarity value (or when the average mean square error is lower than a threshold error value), the feature vectors of the target image patch are determined to be aligned with the pre-calculated feature vectors of the template image. Once the landmark features of the target image patch are globally aligned with the ground-truth landmark features of the template image, local alignment is performed on the target image patch.

FIG. 7 illustrates a method of performing local alignment on the landmark features of the target image patch according to embodiments. The method shown in FIG. 7 may correspond to operation S132 of FIG. 1.

Once the landmark features detected from the target image patch are globally aligned with the ground-truth landmark features of the template image, the landmark features of the target image patch are locally aligned with the ground-truth landmark features of the template image.

For the local alignment, an image warping algorithm, such as mesh-based warping or feature-based image warping, is applied to the target patch image with respect to the template image.

For example, when a mesh-based warping method is applied as shown in FIG. 7, a mesh is generated and overlaid on the target image patch, to define a spatial transformation that maps the landmark features of the target image patch onto the ground-truth landmark features of the template image. The mesh may be formed with a plurality of grid lines that intersect with each other, to segment the target image patch into a plurality of mesh cells.

Referring to FIG. 7, a plurality of fake landmark features may be generated and placed along the boundaries of the target object, to preserve the boundaries of the target object and thereby to maintain the global shape of the target object during the local alignment. The size of the fake landmark features may be set to be smaller than the size of the (true) landmark features inside the target object. Also, the number of the fake landmark features are set to be lower than a threshold number, to avoid interference with the local alignment process. The number of the fake landmark features may be set to be lower than a certain ratio of the number of the fake landmark features to the number of the true landmark features, for example, 5:1 or 4:1. When the number of the true landmark features are seven (7), twenty eight (28) or less fake landmark features may be used to preserve the boundaries of the target object.

The local alignment may be performed through a global operation of a mesh-deformation optimization. The locations of all vertices of the mesh may be optimized together at the same time, rather than being individually optimized, so that after the mesh-based deformation, the positions of the landmark features detected from the target image patch become closer to or match the positions of the ground-truth landmark features.

For example, when the landmark features of the target image patch are represented as feature vectors, $v_1, v_2, v_3, \ldots v_n$, and the ground-truth landmark features are represented as ground-truth feature vectors $w_1, w_2, w_3, w_n$, target displacements $d_1, d_2, d_3, \ldots d_n$ between each pair of the feature vectors, $v_1, v_2, v_3, \ldots v_n$ and the ground-truth feature vectors $w_1, w_2, w_3, \ldots w_n$ are computed as follows: $d_1=w_1-v_1$, $d_2=w_2-v_2$, $d_3=w_3-v_3$ and $d_n=w_n-v_n$.

For mesh cells that contain landmarks, movements of corresponding mesh vertices are driven by the target displacements $d_1, d_2, d_3, \ldots d_n$ of the landmarks. For mesh cells without any landmarks, movements of corresponding mesh vertices are driven by the mesh cells that contain the landmarks by enforcing similarity transformation constraints on the mesh cells without landmarks. In this manner, the global deformation of the mesh may result in a smooth spatial alignment without discontinuity between mesh cells.

Figure 8:
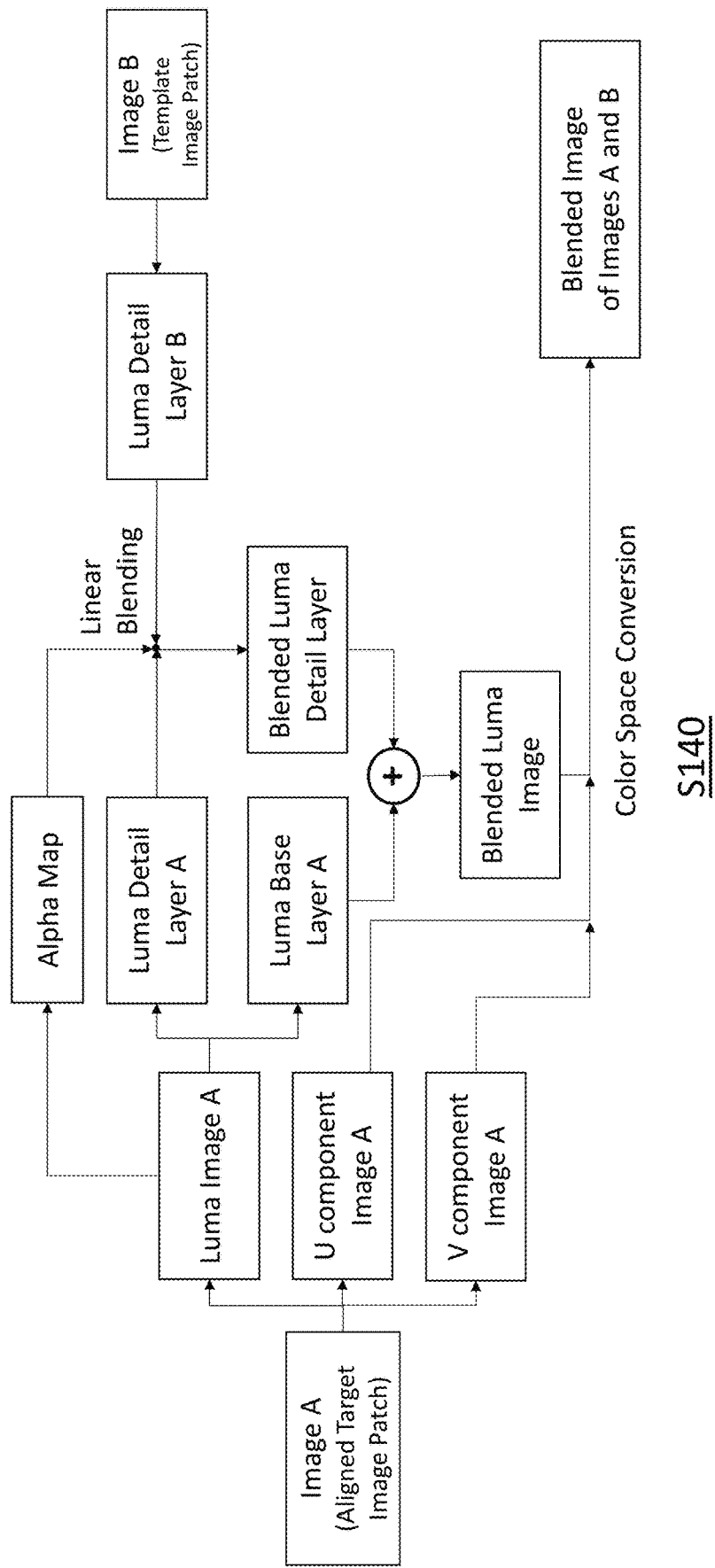
FIG. 8 is a diagram illustrating blending two images to enhance texture details of the target object, according to embodiments.

FIG. 8 is a diagram illustrating blending two images to enhance texture details of the target object, according to embodiments. The method shown in FIG. 8 may correspond to operation S140 of FIG. 1.

Once the landmark features of the target image patch are aligned with the ground-truth landmark features, the target image patch is blended with the template image patch. The aligned target image patch and the template image patch are referred to as image A and image B, respectively, in FIG. 8. In the present embodiment, a color image and a grayscale image are used for image A and image B, respectively, but the embodiment is not limited thereto.

As shown in FIG. 8, color space conversion is performed on image A to convert image A into a first image with a luma component (hereinafter "luma image A"), a second image with a U component (hereinafter "U-component image A"), and a third image with a V component (hereinafter "V-component image A").

An alpha map may be obtained directly from the luma image A based on an intensity value of each pixel of the luma image A.

Additionally, a detail layer (hereinafter "luma detail layer A") and a base layer (hereinafter "luma base layer A") are obtained from the luma image A. For example, the luma base layer A is obtained by applying a smoothing filter, such as a box filter configured to replace each pixel value with an average of its neighboring pixel values or a Gaussian filter configured to use center pixels weighted more than other pixels. For example, an N×N box filter is applied to the luma image A, wherein all weights in the N×N box filter are equal, and N is a natural number greater than 2. When a 3×3 box filter is applied to the luma image A, a center pixel that is surrounded by eight (8) neighboring pixels, is replaced with an average of intensity values of the 8 neighboring pixels, and the replacement processing is performed for each pixel of the luma image A to generate the luma base layer A. The luma detail layer A is obtained by subtracting the luma base layer A from the luma image A.

In the meantime, a detail layer (hereinafter "luma detail layer B") is obtained from the image B, in a manner similar to the method of obtaining the luma detail layer A. For example, a box filter is applied to the image B to obtain a base layer (hereinafter "luma base layer B"), and the luma detail layer B is obtained by subtracting the luma base layer B from the image B.

Once the alpha map, the luma detail layer A, and the luma detail layer B are obtained, linear blending is performed to obtain a blended luma detail layer based on the alpha map, the luma detail layer A, and the luma detail layer B. For example, the blended luma detail layer is obtained based on the following equation:

$$V_{ouput} = \alpha * A + (1-\alpha) * B$$

wherein $V_{ouput}$ denotes the blended luma detail layer, $\alpha$ denotes an alpha value for each pixel in the alpha map, A denotes the luma detail layer A, and B denotes the luma detail layer B. Since a is different for each pixel, the calculation of $V_{ouput}$ may be performed for each pixel.

Through the linear blending, texture details of the target object in the image B is transferred into the image A.

The blended luma detail layer is combined with the luma base layer A to obtain a blended luma image. For example, the blended luma image is obtained by adding the blended luma detail layer and the luma base layer A.

Once the blended luma image is obtained, color space conversion is performed on the blended luma image, the U-component image A, and the V-component image A, to obtain a blended image of the images A and B.

In FIG. 8, the image A and the image B are presumed to be a color image and a grayscale image, respectively, but the types of the images A and B are not limited thereto. For example, when the image A is a grayscale image, the color space conversion for converting the image A into the luma image A, the U-component image A, and the V-component image A may be omitted. Also, when the image B is a color image, an additional color space conversion may be performed to convert the image B to luma image B, U-component image B, and V-component image B.

Figure 9:
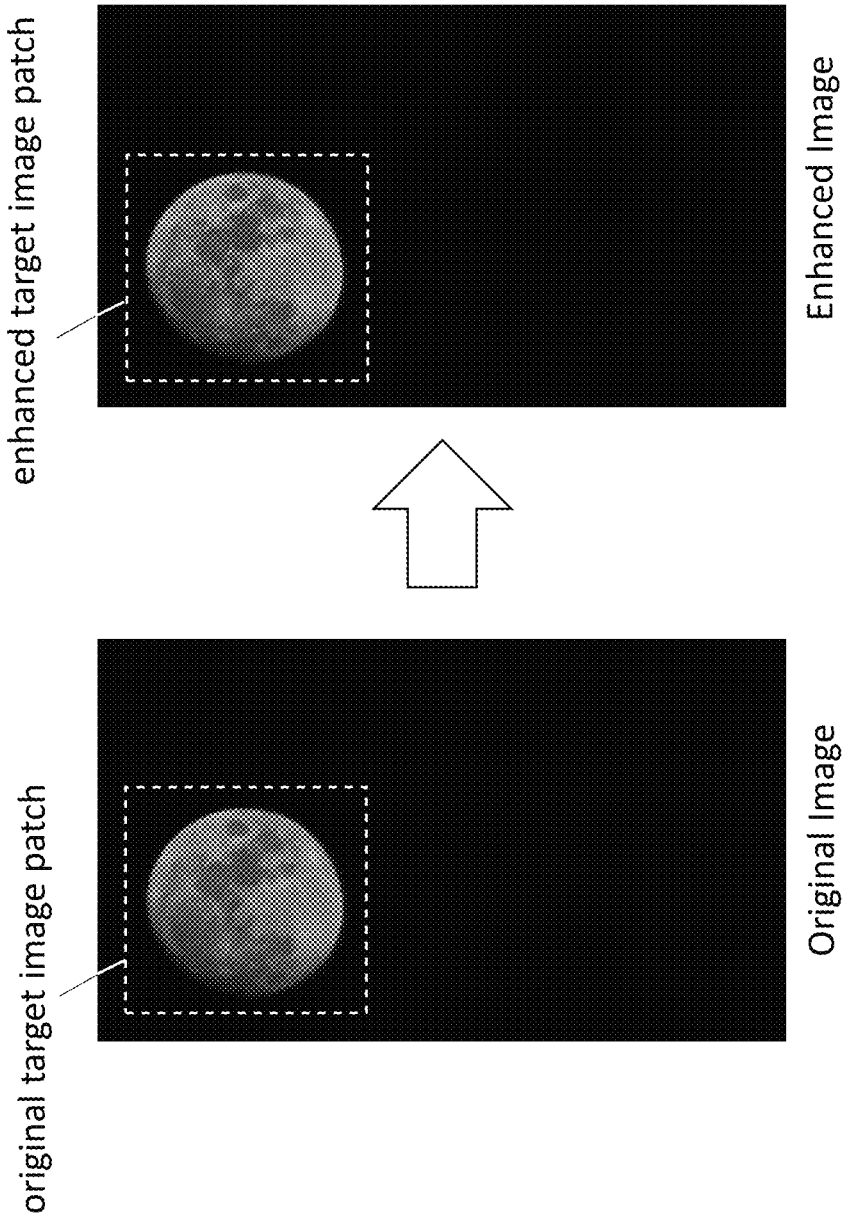
FIG. 9 illustrates a method of replacing an original target image patch with an enhanced target image patch, according to embodiments.

FIG. 9 illustrates a method of replacing an original target image patch with an enhanced target image patch, according to embodiments. The method shown in FIG. 9 may correspond to operation S150 of FIG. 1.

As shown in FIG. 9, an enhanced target image patch corresponding to the blended image of the images A and B is inserted into the position of the original image from which the original target image patch is extracted, based on x and y coordinates of the original target image patch that are stored in the system.

An enhanced image with the transferred texture details is provided to a user as a result of capturing an image of the target object.

Figure 10:
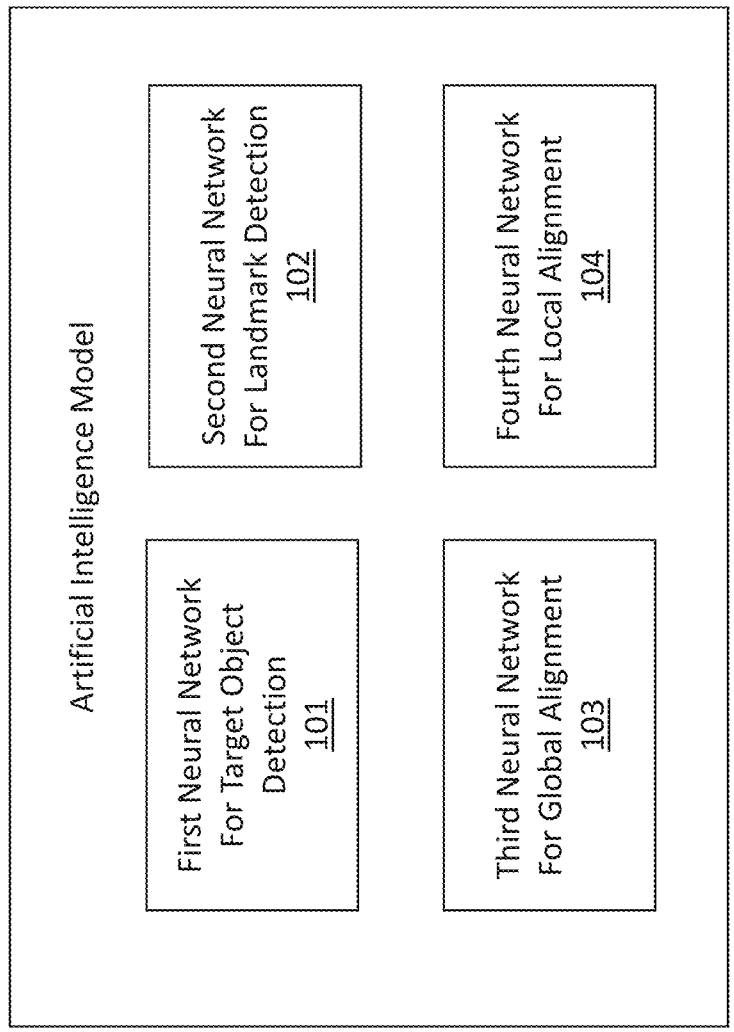
FIG. 10 illustrates a diagram of an artificial intelligence model for performing image processing to another embodiment.

FIG. 10 illustrates a diagram of an artificial intelligence model for performing image processing according to another embodiment.

The artificial intelligence model may include a first neural network 101 for detecting a target object, a second neural network 102 for detecting landmark features of the target object, and a third neural network 103 and a fourth neural network 104 for performing global alignment and local alignment on the landmark features, respectively.

In the embodiment shown in FIG. 10, operations 110, 120, 131, and 132 of FIG. 1 may be performed using the first neural network 101, the second neural network 102, the third neural network 103, and the fourth neural network 104, respectively.

The first neural network 101 may identify a target object from an original image, using a plurality of convolutional layers. The first neural network 101 may be trained using a plurality of sample images including the same target object, to minimize loss between a predicted heat map and a ground-truth heat map.

The second neural network 102 may correspond to the neural network illustrated in FIGS. 3A through 5E, and therefore duplicate descriptions will be omitted.

The third neural network 103 may receive, as input, the landmark features that are detected from the target image patch, and may output an estimated rotation offset between the landmark features of the target image patch and the ground-truth landmark features of the template image. The third neural network 103 may be trained using pre-calculated feature vectors of the ground-truth landmark features. The target image patch is rotated to reduce the estimated rotation offset below a threshold offset value.

The fourth neural network 104 may receive, as input, the globally aligned landmark features, and may output an image in which the globally aligned landmark features are locally matched to the ground-truth landmark features.

Figure 11:
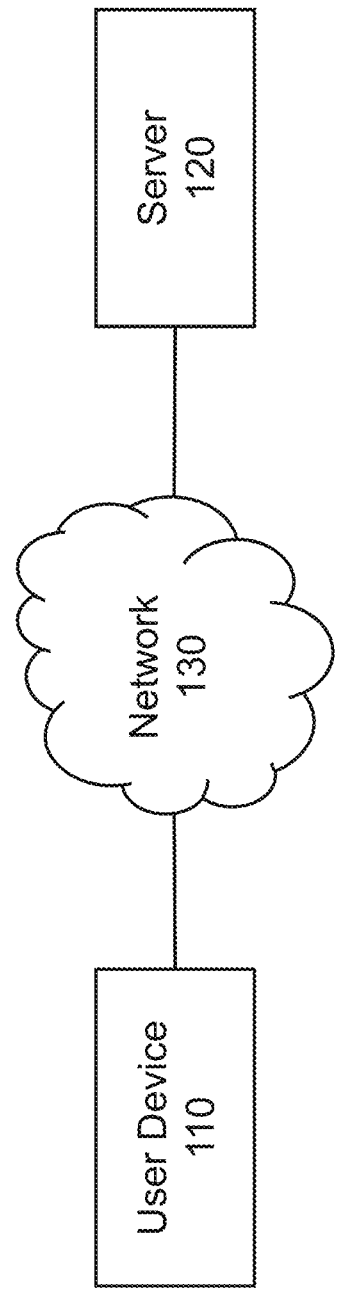
FIG. 11 is a diagram of devices for performing image processing according to embodiments.

FIG. 11 is a diagram of devices for performing image processing according to embodiments of the present disclosure. FIG. 11 includes a user device 110, a server 120, and a network 130. The user device 110 and the server 120 may interconnect via wired connections, wireless connections, or a combination of wired and wireless connections.

The user device 110 includes one or more devices configured to capture an original image and generate an enhanced image. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a camera device, a wearable device (e.g., a pair of smart glasses or a smart watch), or a similar device. The user device 110 may perform all or some of operations S110-S150 described with reference to FIGS. 1-9, and may include any one or any combination of the neural networks 101-104 shown in FIG. 10.

The server 120 includes one or more devices configured to train a neural network for detecting landmark features from a target object captured in an original camera image to enhance texture details of the target object in the camera image. For example, the server 120 may be a server, a computing device, or the like. The server 120 may receive a camera image from an external device (e.g., the user device 110 or another external device), train a neural network for detecting landmark features from the camera image, and provide the trained neural network to the user device 110 to permit the user device 110 to generate an output image using the neural network. Further, the server 120 may perform all or some of operations S110-S150 described in FIGS. 1-10, and may include any one or any combination of the neural networks 101-104 illustrated in FIG. 10.

The network 130 includes one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 11 are provided as an example. In practice, there may be additional devices and/or networks, fewer devices and/or networks, different devices and/or networks, or differently arranged devices and/or networks than those shown in FIG. 11. Furthermore, two or more devices shown in FIG. 11 may be implemented within a single device, or a single device shown in FIG. 11 may be implemented as multiple, distributed devices. Additionally, or alternatively, a set of devices (e.g., one or more devices) may perform one or more functions described as being performed by another set of devices.

Figure 12:
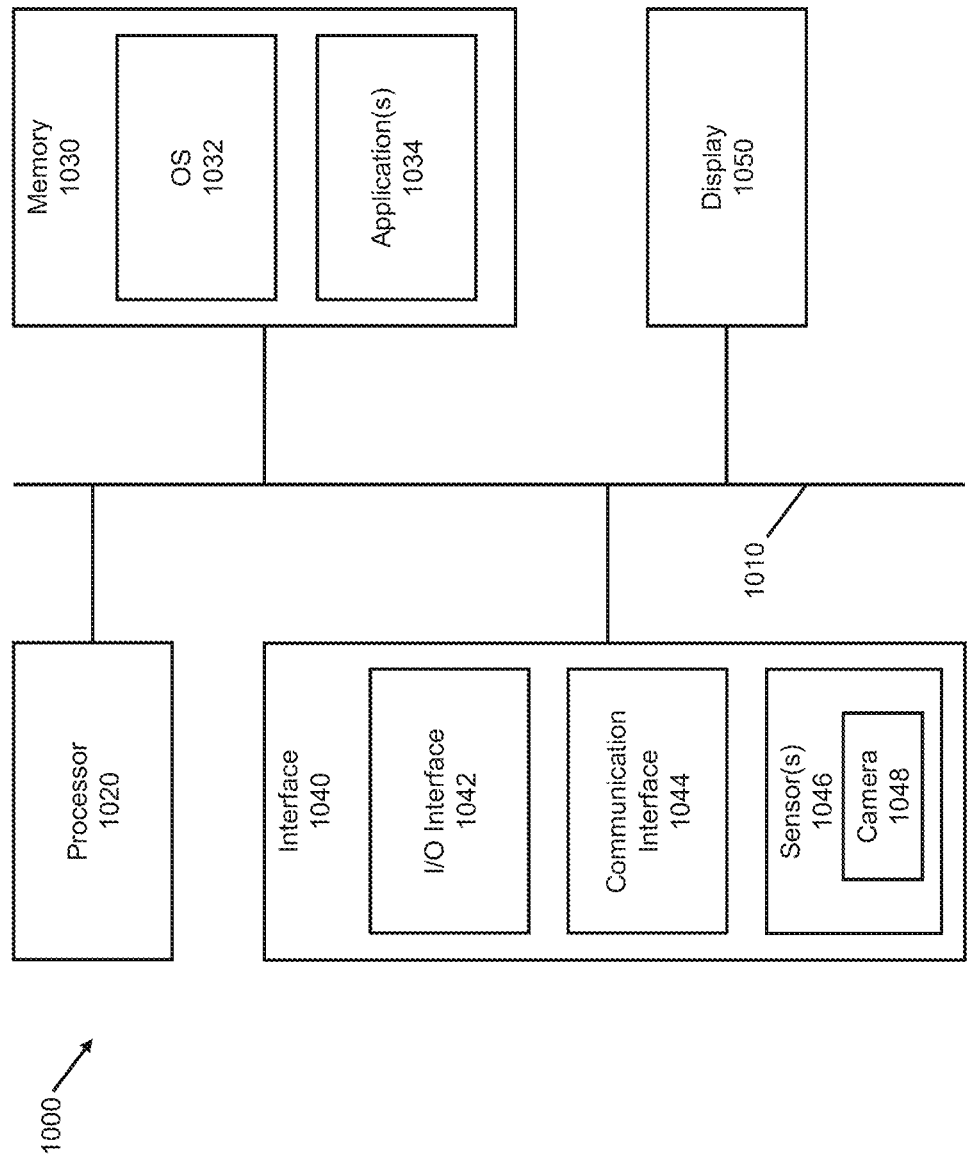
FIG. 12 is a diagram of components of one or more devices of FIG. 11 according to embodiments.

FIG. 12 is a diagram of components of one or more devices of FIG. 11 according to an embodiment. An electronic device 1000 may correspond to the user device 110 and/or the server 120.

FIG. 12 is for illustration only, and other embodiments of the electronic device 100 could be used without departing from the scope of this disclosure.

The electronic device 1000 includes a bus 1010, a processor 1020, a memory 1030, an interface 1040, and a display 1050.

The bus 1010 includes a circuit for connecting the components 1020 to 1050 with one another. The bus 1010 functions as a communication system for transferring data between the components 1020 to 1050 or between electronic devices.

The processor 1020 includes one or more of a central processing unit (CPU), a graphics processor unit (GPU), an accelerated processing unit (APU), a many integrated core (MIC), a field-programmable gate array (FPGA), or a digital signal processor (DSP). The processor 1020 is able to perform control of any one or any combination of the other components of the device 1000, and/or perform an operation or data processing relating to communication. The processor 1020 executes one or more programs stored in the memory 1030, to perform operations S110-S150 illustrated in FIGS. 1-9 according to embodiments of the present disclosure. Also, the processor may perform the operations of the neural networks 101-104 illustrated in FIG. 10 according to another embodiment of the present disclosure.

The memory 1030 may include a volatile and/or non-volatile memory. The memory 1030 stores information, such as one or more of commands, data, programs (one or more instructions), a neural network (e.g., the neural network shown in FIGS. 3A through 5E, and the neural networks 101-104 illustrated in FIG. 10), and applications 1034, etc., which are related to at least one other component of the electronic device 1000 and for driving and controlling the electronic device 1000. For example, commands and/or data may formulate an operating system (OS) 1032. Information stored in the memory 1030 may be executed by the processor 1020.

In particular, the memory 1030 may store a plurality of high resolution template images (e.g., an image with 300 or more number of pixels per inch) including a plurality of different target objects, in association with a plurality of ground-truth features for each of the different target objects. For example, the memory 1030 may store a first high resolution template image including the moon as the target object, a second high resolution template image including a historical structure, such as Leaning Tower of Pisa, the Great Wall of China, or the Great Pyramid of Giza, as the target object, and a third high resolution template image including a national flag as the target object. Also, the memory 1030 may store ground-truth landmark features of the target object included in each of the first to the third high resolution template images.

The applications 1034 include the above-discussed embodiments. These functions can be performed by a single application or by multiple applications that each carry out one or more of these functions.

The display 1050 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 1050 can also be a depth-aware display, such as a multi-focal display. The display 1050 is able to present, for example, various contents, such as text, images, videos, icons, and symbols.

The interface 1040 includes input/output (I/O) interface 1042, communication interface 1044, and/or one or more sensors 1046. The I/O interface 1042 serves as an interface that can, for example, transfer commands and/or data between a user and/or other external devices and other component(s) of the device 1000. For example, the I/O interface 1042 provides a graphic user interface that allows a user to select a Moon shot mode or an image enhancement mode. When an image is captured in the Moon shot mode or the image enhancement mode, the processor 1020 performs operations S110 through S150 to provide an enhanced image.

The sensor(s) 1046 can meter a physical quantity or detect an activation state of the electronic device 1000 and convert metered or detected information into an electrical signal. For example, the sensor(s) 1046 can include one or more cameras 1048 or other imaging sensors for capturing images of scenes. The sensor(s) 1046 can also include any one or any combination of a microphone, a keyboard, a mouse, and one or more buttons for touch input. In addition, the sensor(s) 1046 can include a control circuit for controlling at least one of the sensors included herein. Any of these sensor(s) 1046 can be located within or coupled to the device 1000. The sensors 1046 may be used to detect touch input, gesture input, and hovering input, using an electronic pen or a body portion of a user, etc.

The communication interface 1044, for example, is able to set up communication between the electronic device 1000 and an external electronic device. The communication interface 1044 can be a wired or wireless transceiver or any other component for transmitting and receiving signals.

Figure 13:
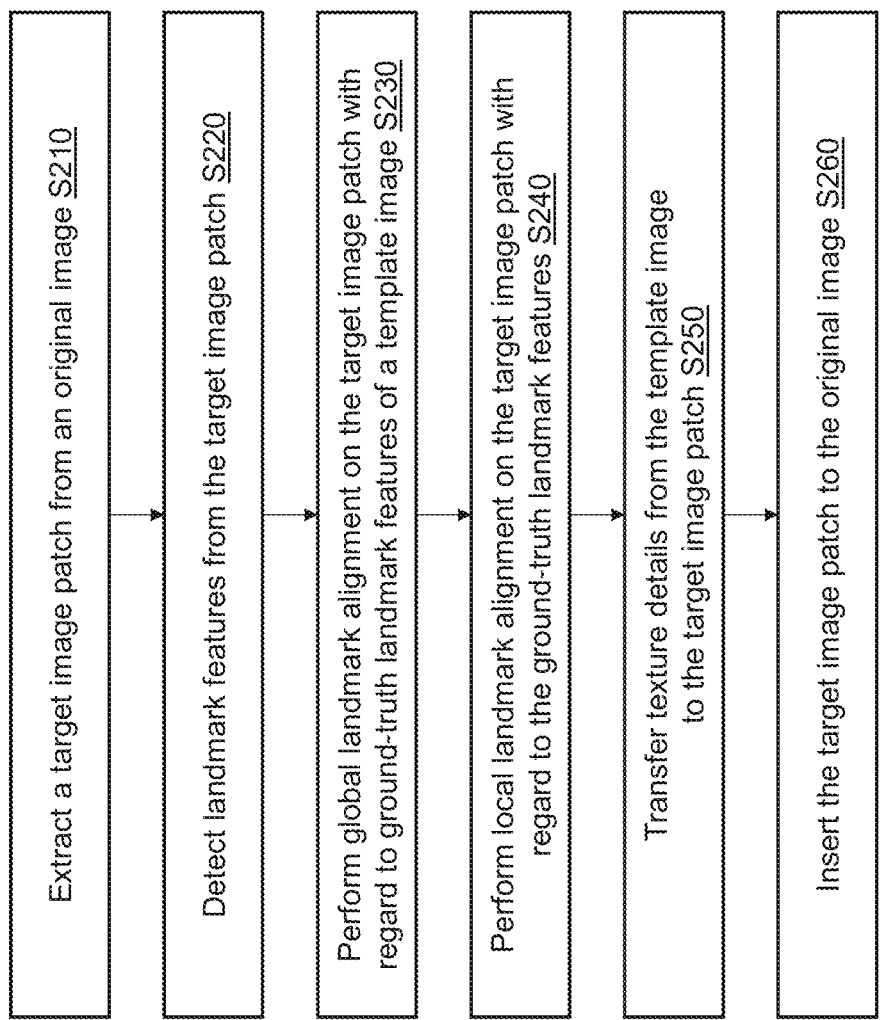
FIG. 13 is a flowchart illustrating a method of enhancing texture details of a target object captured in an original image according to embodiments.

FIG. 13 is a flowchart illustrating a method of enhancing texture details of a target object captured in an original image, according to an embodiment of the present disclosure.

In operation S210, the processor 1020 may extract a target image patch from an original image that is captured by the camera 1048, or that is received from an external device or an external camera. The target image patch may include a predetermined target object.

The processor 1020 may detect the boundaries of the target object from the original image, by identifying edges at which image brightness changes sharply. Once the boundaries of the target object are detected, the processor 1020 may crop an area including the target object from the original image, to obtain the target image patch. When the target image patch is cropped from the original image, the processor 1020 may obtain position information (e.g., x and y coordinates) of the target image patch in the original image and store the position information in the memory 1030. Based on the position information, the (original) target image patch is to be replaced with an enhanced target image patch in the original image, after the target image patch is converted into the enhanced target image patch.

In operation S220, the processor 1020 may detect a plurality of landmark features from the target image patch, via a neural network which has been trained to output a prediction of a heat map of landmarks using a ground-truth heat map.

In operation S230, the processor 1020 may perform global alignment on the landmark features of the target image patch with respect to the ground-truth landmark features of a template image.

The processor 1020 may calculate the similarity between the landmark features of the target image patch and the ground-truth landmark features of the template image. The processor 1020 may shift or rotate the landmark features of the target image patch to be aligned with the ground-truth landmark features of the template image in a direction in which the similarity increases. The similarity may be expressed as a rotation offset of the landmark features of the target image patch in comparison with the ground-truth landmark features.

For example, the processor 1020 may compute an average mean square error between the landmark features of the target image patch and the ground-truth landmark features of the template image as a value representing the similarity. The landmark features may be expressed as feature vectors, each having a magnitude and a direction, that indicate the distance between a reference point and each of the landmark features, and the direction from the reference point to each of the landmark features, respectively. The processor 1020 may shift or rotate the target image patch and the landmark features as a group, by one degree at a time, in a stepwise manner, to find the best match that maximizes the similarity (or that minimizes the average mean square error).

Once the landmark features of the target image patch are globally aligned with the ground-truth landmark features of the template image, the processor 1020 proceeds to operation S240 to perform local alignment on the globally aligned landmark features of the target image patch.

In operation S240, the processor 1020 may apply a distance thresholding method to match the landmark features of the target image patch to the ground-truth landmark features of the template image. The processor 1020 may divide the target image patch into a plurality of sections. When the distances between the landmark features of the target image patch and the ground-truth landmark features of the template image are greater than a pre-set threshold value, the processor 1020 may determine the landmark features of the target image patch as misaligned features and may transform the sections of the target image patches including the misaligned features so that the landmark features of the target image patch overlap with the ground-truth landmark features of the template image.

Additionally, in operation S240, the processor 1020 may add fake landmark features to the target image patch along the boundaries of the target object, to maintain the global shape of the target object during the local alignment.

Once the landmark features of the target image patch are globally and locally aligned with the ground-truth landmark features of the template image, the processor 1020 may proceed to operation S250 to blend the target image patch with the template image.

In operation S250, the processor 1020 may transfer texture details of the target object in the template image to the target image patch, for example, using a linear blending method, to generate an enhanced target image patch.

Figure 14:
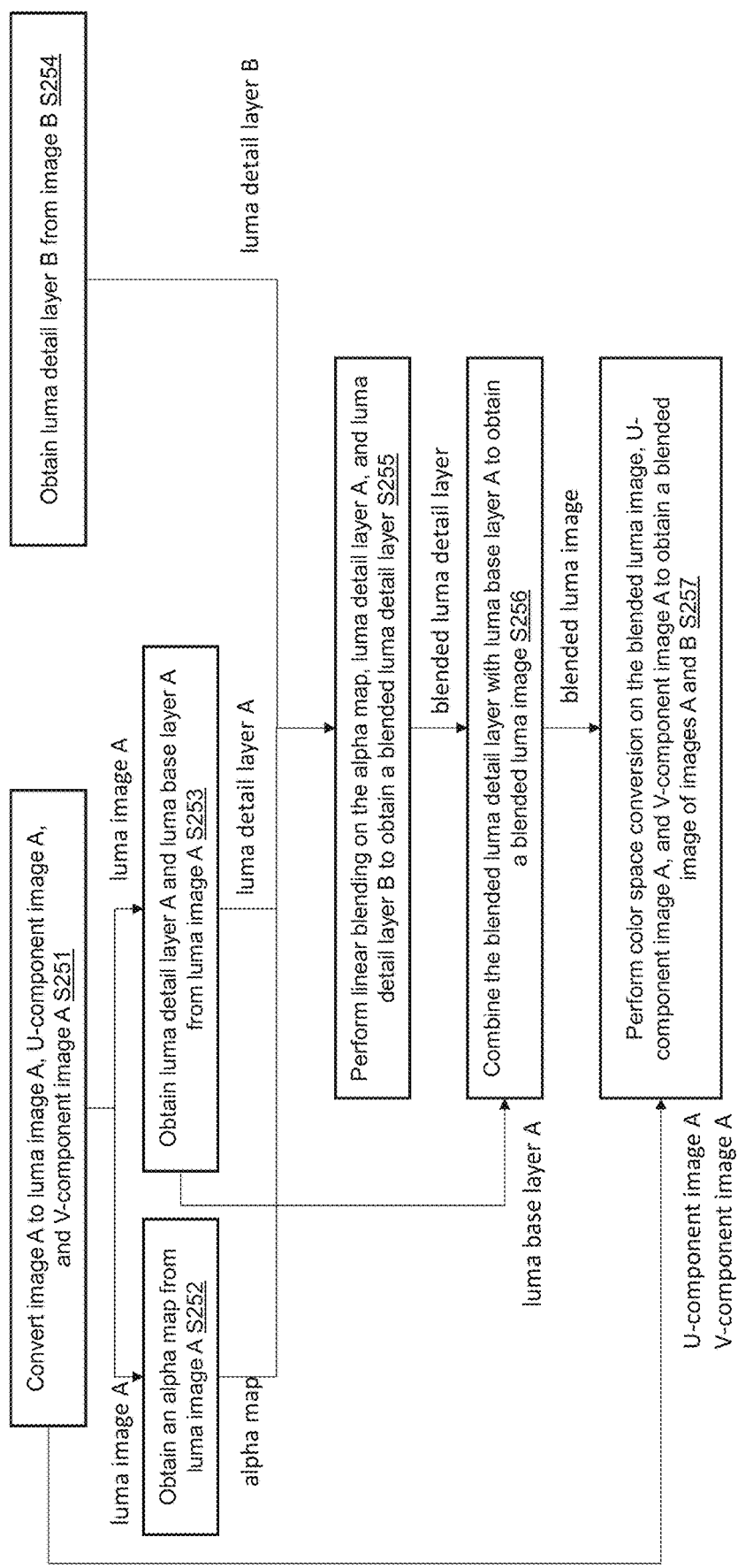
FIG. 14 is a flowchart illustrating a method of transferring texture details of a target object in a template image to a target image patch of an original image, according to embodiments.

FIG. 14 is a flowchart illustrating operation S250 in detail.

In operation S251, when the aligned target image patch and the template image patch are referred to as image A and image B, respectively, the processor 1020 may perform color space conversion on image A to convert image A into a first image with a luma component (hereinafter "luma image A"), a second image with a U component (hereinafter "U-component image A"), and a third image with a V component (hereinafter "V-component image A").

In operation S252, the processor 1020 may obtain an alpha map directly from the luma image A based on an intensity value of each pixel of the luma image A.

In operation S253, the processor 1020 may obtain a detail layer (hereinafter "luma detail layer A") and a base layer (hereinafter "luma base layer A") from the luma image A. For example, the processor 1020 may obtain the luma base layer A by applying a smoothing filter to the luma image A, and may obtain the luma detail layer A by subtracting the luma base layer A from the luma image A.

In the meantime, in operation S254, the processor 1020 may obtain a detail layer (hereinafter "luma detail layer B") from the image B, in a manner similar to the method of obtaining the luma detail layer A. For example, the processor 1020 may apply a box filter to the image B to obtain a base layer (hereinafter "luma base layer B"), and may obtain the luma detail layer B by subtracting the luma base layer B from the image B.

Once the alpha map, the luma detail layer A, and the luma detail layer B are obtained, the processor 1020 proceeds to operation S255 to perform linear blending on the alpha map, the luma detail layer A, and the luma detail layer B to obtain a blended luma detail layer. For example, the processor 1020 may obtain the blended luma detail layer based on the following equation:

$$V_{ouput}=\alpha*A+(1-\alpha)*B$$

wherein $V_{ouput}$ denotes the blended luma detail layer, $\alpha$ denotes an alpha value for each pixel in the alpha map, A denotes the luma detail layer A, and B denotes the luma detail layer B. Since a is different for each pixel, the calculation of $V_{ouput}$ may be performed for each pixel.

Through the linear blending, texture details of the target object in the image B is transferred into the image A.

In operation S256, the processor 1020 may combine the blended luma detail layer with the luma base layer A to obtain a blended luma image. For example, the processor 1020 may add the blended luma detail layer and the luma base layer A to obtain the blended luma image.

Once the blended luma image is obtained, in operation S257, the processor 1020 performs color space conversion on the blended luma image, the U-component image A, and the V-component image A, to obtain a blended image of the images A and B.

Referring back to FIG. 13, in operation S260, the processor 1020 may insert the enhanced target image patch into the original image at the position of the original target image patch based on the position information of the original target image patch stored in the memory 1030, to replace the original target image with the enhanced target image patch.

Figure 15:
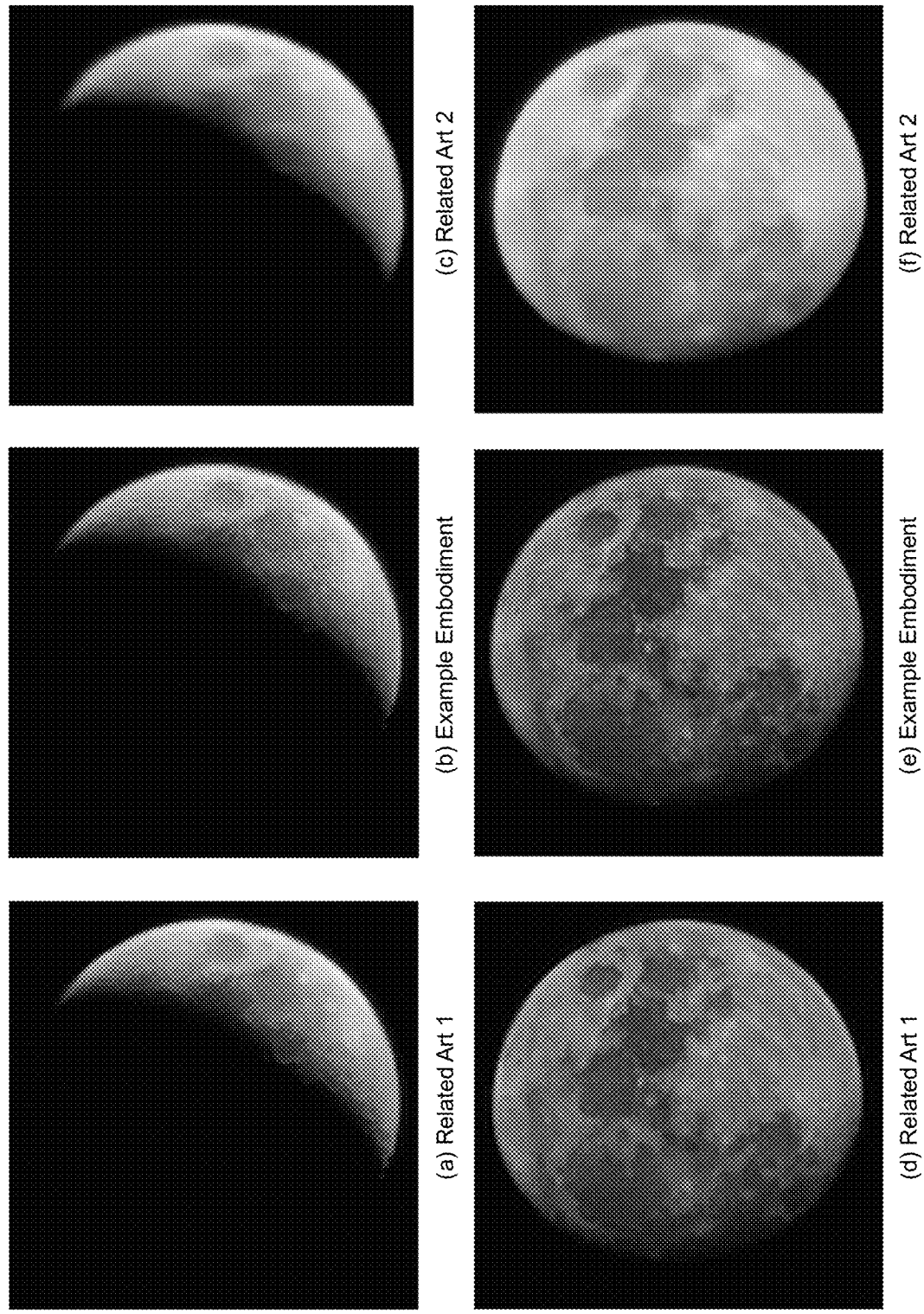
FIG. 15 illustrates images obtained according to an embodiment of the present application, in comparison with images obtained by conventional image processing methods.

FIG. 15 shows images obtained according to an embodiment of the present application, in comparison with images obtained by conventional image processing methods.

As shown in FIG. 15, image (e) of the full Moon and image (b) of the crescent Moon according to embodiments of the present disclosure provide a higher texture resolution for a target object, compared with images (a) and (d) according to a conventional image processing method, and images (c) and (f) according to another conventional image processing method.

The embodiments of the disclosure described above may be written as computer executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to the electronic device 1000, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The above described method may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of the server.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

What is claimed is:

1. An apparatus for processing image data, the apparatus comprising:
a memory storing instructions; and
a processor configured to execute the instructions to:
extract a target image patch including a target object, from a captured image; obtain a plurality of landmark features from the target image patch;
align the plurality of landmark features of the target image patch with a plurality of reference landmark features in a template image patch including the same target object through a global alignment and a local alignment, wherein the global alignment is performed by adding a plurality of fake landmarks directly on a boundary of the target object to maintain a boundary shape of the target object in the target image patch; and when the plurality of landmark features are aligned with the plurality of reference landmark features, transfer texture details of the target object in the template image patch to the target object in the target image patch, wherein a ratio of a number of the plurality of fake landmarks to a number of the plurality of landmark features in the target image patch is lower than 5.

2. The apparatus of claim 1, wherein the processor is further configured to obtain the plurality of landmark features using a neural network that is trained to predict a heat map indicating landmark positions in an image, by minimizing loss between the predicted heat map and a ground-truth heat map.

3. The apparatus of claim 1, wherein the processor is further configured to execute the instructions to:

compute a rotation offset of the plurality of landmark features of the target image patch in comparison with the plurality of reference landmark features; and perform the global alignment on the target image patch by rotating the target image patch by the rotation offset.

4. The apparatus of claim 3, wherein each of the plurality of landmark features is represented as a rotation angle with respect to a reference point and a reference line, and a ratio of a distance from each of the plurality of landmark features to the reference point, to a radius of a circle that surrounds the boundary of the target object.

5. The apparatus of claim 4, wherein the target object is the Moon, the reference point is a center of the Moon in the target image patch, the reference line is a symmetry line that crosses the center of the Moon in the target image patch, and the radius of the circle is a radius of the Moon captured in the target image patch.

6. The apparatus of claim 3, wherein the processor is further configured to execute the instructions to:

after the global alignment, perform the local alignment on the target image patch by matching the plurality of landmark features to the plurality of reference landmark features while maintaining the boundary shape of the target object in the target image patch.

7. The apparatus of claim 1, wherein the number of the plurality of fake landmarks added on the boundary of the target object is less than a predetermined threshold.

8. The apparatus of claim 1, wherein the processor is further configured to execute the instructions to:

transfer the texture details of the template image patch by blending a target luma detail layer of the target image patch with a template luma detail layer of the template image patch, based on an alpha map that is obtained from the target image patch.

9. The apparatus of claim 1, wherein the processor is further configured to execute the instructions to:

when extracting the target image patch from the captured image, identify pixel coordinates of the target image patch in the captured image, and replace the target image patch in the captured image, with the target image patch into which the texture details of the template image patch are transferred, based on information of the pixel coordinates of the target image patch in the captured image.

10. A method for processing image data, the method comprising:

extracting a target image patch including a target object, from a captured image;

obtaining a plurality of landmark features from the target image patch;

aligning the plurality of landmark features of the target image patch with a plurality of reference landmark features in a template image patch including the same target object through a global alignment and a local alignment, wherein the global alignment is performed by adding a plurality of fake landmarks directly on a boundary of the target object to maintain a boundary shape of the target object in the target image patch; and when the plurality of landmark features are aligned with the plurality of reference landmark features, transferring texture details of the target object in the template image patch to the target object in the target image patch, wherein a ratio of a number of the plurality of fake landmarks to a number of the plurality of landmark features in the target image patch is lower than 5.

11. The method of claim 10, wherein the obtaining the plurality of landmark features comprises:

obtaining the plurality of landmark features using a neural network that is trained to predict a heat map indicating landmark positions in an image, by minimizing loss between the predicted heat map and a ground-truth heat map.

12. The method of claim 10, wherein the aligning the plurality of landmark features of the target image patch further comprises:

computing a rotation offset of the plurality of landmark features of the target image patch in comparison with the plurality of reference landmark features; and performing the global alignment on the target image patch by rotating the target image patch by the rotation offset.

13. The method of claim 12, wherein each of the plurality of landmark features is represented as a rotation angle with respect to a reference point and a reference line, and a ratio of a distance from each of the plurality of landmark features to the reference point, to a radius of a circle that surrounds the boundary of the target object.

14. The method of claim 13, wherein the target object is Moon, the reference point is a center of the Moon in the target image patch, the reference line is a symmetry line that crosses the center of the Moon in the target image patch, and the radius of the circle is a radius of the Moon captured in the target image patch.

15. The method of claim 14, further comprising:

after the global alignment, performing the local alignment on the target image patch by matching the plurality of landmark features to the plurality of reference landmark features while maintaining the boundary shape of the target object in the target image patch.

16. The method of claim 10, wherein the number of the plurality of fake landmarks added on the boundary of the target object is less than a predetermined threshold.

17. The method of claim 10, the transferring the texture details of the target object comprises:

transferring the texture details of the template image patch by blending a target luma detail layer of the target image patch with a template luma detail layer of the template image patch, based on an alpha map that is obtained from the target image patch.

18. The method of claim 10, further comprising:

when extracting the target image patch from the captured image, identifying pixel coordinates of the target image patch in the captured image, and replacing the target image patch in the captured image, with the target image patch into which the texture details of the template image patch are transferred, based on information of the pixel coordinates of the target image patch in the captured image.

19. A non-transitory computer readable storage medium storing a program to be executable by at least one processor to perform a method for processing image data, the method comprising:
  extracting a target image patch including a target object, from a captured image;
  obtaining a plurality of landmark features from the target image patch;
  aligning the plurality of landmark features of the target image patch with a plurality of reference landmark features in a template image patch including the same target object through a global alignment and a local alignment, wherein the global alignment is performed by adding a plurality of fake landmarks directly on a boundary of the target object to maintain a boundary shape of the target object in the target image patch; and
  when the plurality of landmark features are aligned with the plurality of reference landmark features, transferring texture details of the target object in the template image patch to the target object in the target image patch,
  wherein a ratio of a number of the plurality of fake landmarks to a number of the plurality of landmark features in the target image patch is lower than 5.

20. The non-transitory computer readable storage medium of claim 19, wherein the obtaining the plurality of landmark features comprises:
  obtaining the plurality of landmark features using a neural network that is trained to predict a heat map indicating landmark positions in an image, by minimizing loss between the predicted heat map and a ground-truth heat map.

* * * * *